US007384336B2

(12) United States Patent
Torango

(10) Patent No.: US 7,384,336 B2
(45) Date of Patent: *Jun. 10, 2008

(54) PROGRESSIVE SYSTEM AND METHODS

(76) Inventor: Lawrence J. Torango, 2240 Idlewild Dr., Reno, NV (US) 89509

(*) Notice: Subject to any disclaimer, the term of this patent is extended or adjusted under 35 U.S.C. 154(b) by 949 days.

This patent is subject to a terminal disclaimer.

(21) Appl. No.: 10/171,205

(22) Filed: Jun. 11, 2002

(65) Prior Publication Data

US 2003/0060279 A1 Mar. 27, 2003

Related U.S. Application Data

(60) Continuation-in-part of application No. 09/698,941, filed on Oct. 27, 2000, now Pat. No. 6,435,968, which is a division of application No. 09/005,341, filed on Jan. 9, 1998, now Pat. No. 6,241,608.

(60) Provisional application No. 60/300,333, filed on Jun. 22, 2001, provisional application No. 60/050,971, filed on Jun. 19, 1997, provisional application No. 60/040,982, filed on Mar. 17, 1997, provisional application No. 60/035,513, filed on Jan. 15, 1997.

(51) Int. Cl.
*A63F 13/00* (2006.01)
*A63F 9/24* (2006.01)

(52) U.S. Cl. ............................ 463/27; 463/25; 463/26; 463/29; 463/40; 463/41; 463/42; 273/453

(58) Field of Classification Search .................. 463/16, 463/20, 21, 25–29, 40, 42
See application file for complete search history.

(56) References Cited

U.S. PATENT DOCUMENTS 3,998,309 A 12/1976 Mandas et al.

(Continued)

FOREIGN PATENT DOCUMENTS

AU 524709 8/1979

(Continued)

OTHER PUBLICATIONS

Crevelt, Dwight & Louise; *Video Poker Mania!!*; Gollehon Press, Inc., Grand Rapids, MI; 1991; Chapter 3; pp. 48-75.

*Primary Examiner*—Corbett Coburn
*Assistant Examiner*—Omkar A. Deodhar
(74) *Attorney, Agent, or Firm*—James Creighton Wray; Clifford D. Hyra

(57) ABSTRACT

The specification discloses a progressive gaming system having a central system, at least one prize, a progressive method, and at least one monetary transaction acceptor. The central system is adapted to associate the progressive method with the prize and the monetary transaction acceptor thereby allowing the monetary transaction acceptor to participate for the prize. The progressive method is adapted to determine a participation outcome based at least on the monetary transaction acceptor's contribution percent factor.

The specification also discloses a progressive gaming system and methods having the ability to expand the participation base for a progressive prize to include a wide variety of monetary transaction acceptors. The progressive gaming system and methods may have the capability to accept a monetary transaction value in a plurality of currencies or a plurality of denominations of the same currency. The progressive gaming system and methods may support multiple prizes simultaneously. Each monetary transaction acceptor may be linked to one or more prizes.

75 Claims, 19 Drawing Sheets

U.S. PATENT DOCUMENTS

| | | | | | |
|---|---|---|---|---|---|
| 4,238,127 | A | | 12/1980 | Lucero et al. | |
| 4,448,419 | A | | 5/1984 | Telnaes | |
| 4,573,681 | A | | 3/1986 | Okada | |
| 4,652,998 | A | | 3/1987 | Koza et al. | |
| 4,669,731 | A | | 6/1987 | Clarke | |
| 4,817,951 | A | | 4/1989 | Crouch et al. | |
| 4,837,728 | A | * | 6/1989 | Barrie et al. | 463/27 |
| 4,842,278 | A | | 6/1989 | Markowicz | |
| 4,871,171 | A | | 10/1989 | Rivero | |
| 4,964,638 | A | | 10/1990 | Ishida | |
| 5,016,880 | A | | 5/1991 | Berge | |
| 5,048,833 | A | | 9/1991 | Lamle | |
| 5,116,055 | A | | 5/1992 | Tracy | |
| 5,123,649 | A | | 6/1992 | Tiberio | |
| 5,249,800 | A | | 10/1993 | Hilgendorf et al. | |
| 5,259,616 | A | | 11/1993 | Bergmann | |
| 5,276,312 | A | | 1/1994 | McCarthy | |
| 5,277,424 | A | | 1/1994 | Wilms | |
| 5,280,909 | A | | 1/1994 | Tracy | |
| 5,342,049 | A | | 8/1994 | Wichinsky et al. | |
| 5,344,144 | A | | 9/1994 | Canon | |
| 5,377,993 | A | | 1/1995 | Josephs | |
| 5,393,057 | A | | 2/1995 | Marnell, II | |
| 5,401,024 | A | | 3/1995 | Simunek | |
| 5,423,539 | A | | 6/1995 | Nagao | |
| 5,429,361 | A | | 7/1995 | Raven et al. | |
| 5,472,194 | A | | 12/1995 | Breeding et al. | |
| 5,511,781 | A | | 4/1996 | Wood et al. | |
| 5,524,888 | A | | 6/1996 | Heidel | |
| 5,536,016 | A | | 7/1996 | Thompson | |
| 5,547,192 | A | | 8/1996 | Ishibashi | |
| 5,564,700 | A | * | 10/1996 | Celona | 463/27 |
| 5,566,337 | A | | 10/1996 | Szymanski et al. | |
| 5,570,885 | A | | 11/1996 | Ornstein | |
| 5,580,309 | A | | 12/1996 | Piechowiak et al. | |
| 5,611,535 | A | | 3/1997 | Tiberio | |
| 5,611,730 | A | | 3/1997 | Weiss | |
| 5,626,341 | A | | 5/1997 | Jones et al. | |
| 5,644,730 | A | | 7/1997 | Fayfield | |
| 5,645,486 | A | | 7/1997 | Nagao et al. | |
| 5,655,961 | A | | 8/1997 | Acres et al. | |
| 5,702,304 | A | | 12/1997 | Acres et al. | |
| 5,743,800 | A | * | 4/1998 | Huard et al. | 463/26 |
| 5,762,552 | A | | 6/1998 | Vuong et al. | |
| 5,766,076 | A | | 6/1998 | Pease et al. | |
| 5,788,573 | A | | 8/1998 | Baerlocher et al. | |
| 5,806,855 | A | | 9/1998 | Cherry | |
| 5,807,172 | A | | 9/1998 | Piechowiak | |
| 5,820,459 | A | | 10/1998 | Acres et al. | |
| 5,823,874 | A | | 10/1998 | Adams | |
| 5,833,538 | A | | 11/1998 | Weiss | |
| 5,851,011 | A | | 12/1998 | Lott | |
| 5,855,515 | A | | 1/1999 | Pease et al. | |
| 5,885,158 | A | | 3/1999 | Torango et al. | |
| 5,941,773 | A | | 8/1999 | Harlick | |
| 5,947,822 | A | | 9/1999 | Weiss | |
| 5,951,011 | A | | 9/1999 | Potter et al. | |
| 5,993,316 | A | | 11/1999 | Coyle et al. | |
| 6,015,344 | A | * | 1/2000 | Kelly et al. | 463/16 |
| 6,032,955 | A | | 3/2000 | Luciano et al. | |
| 6,089,977 | A | | 7/2000 | Bennett | |
| 6,135,884 | A | | 10/2000 | Hedrick et al. | |
| 6,146,270 | A | * | 11/2000 | Huard et al. | 463/12 |
| 6,241,608 | B1 | * | 6/2001 | Torango | 463/27 |
| 6,315,666 | B1 | | 11/2001 | Mastera et al. | |
| 6,435,968 | B1 | * | 8/2002 | Torango | 463/27 |
| 6,491,584 | B2 | | 12/2002 | Graham et al. | |

FOREIGN PATENT DOCUMENTS

| | | |
|---|---|---|
| AU | 589158 | 5/1989 |
| AU | 630112 | 10/1992 |
| AU | 633469 | 1/1993 |
| AU | 707687 | 4/1997 |
| AU | 716299 | 1/1998 |
| AU | 722107 | 5/1998 |
| AU | 748263 | 11/1998 |
| AU | 754689 | 2/1999 |
| AU | 749222 | 3/1999 |
| AU | 728788 | 7/1999 |
| AU | 751088 | 12/2000 |
| GB | 2153572 | 8/1985 |
| GB | 2187320 | 9/1987 |

* cited by examiner

| Prize ID | Prize Name | Progressive Method ID | Total Contribution Amount | Contribution Percent Factor | Selection Criteria |
|---|---|---|---|---|---|
| 12345 | Big Bonanza | PM001 | 2,500,000 | 0.25678 | PR>3 |
| 23456 | Super Hits | PM002 | 5,000,000 | 0.25678 | MV>2.99 |
| 34567 | Lots-A-Money | PM003 | 10,000,000 | 0.25678 | PR>4&MV>4.99 |
| 45678 | Free And Clear | PM004 | 1,000,000 | 0.25678 | null |
| 56789 | Get Away | PM005 | 500,000 | 0.25678 | null |

Figure 6

| A | B | C | D | E | F |
|---|---|---|---|---|---|
| | | | =C/(A*B) | =(A*B)*D | =A*D |
| Transaction Value | Contribution Percent Factor | Prize's Total Contribution Amount | Computed Odds | Computed Prize's Total Contribution Amount | Computed Total Wager |
| 0.05 | 0.00123 | 1,890,123 | 30,733,707,317 | 1,890,123 | 1,536,685,366 |
| 0.05 | 0.01234 | 1,890,123 | 3,063,408,428 | 1,890,123 | 153,170,421 |
| 0.05 | 0.03456 | 1,890,123 | 1,093,821,181 | 1,890,123 | 54,691,059 |
| 0.05 | 0.08765 | 1,890,123 | 431,288,762 | 1,890,123 | 21,564,438 |
| 0.05 | 0.25000 | 1,890,123 | 151,209,840 | 1,890,123 | 7,560,492 |
| 0.05 | 0.95000 | 1,890,123 | 39,792,063 | 1,890,123 | 1,989,603 |
| | | | | | |
| 0.10 | 0.00123 | 1,890,123 | 15,366,853,659 | 1,890,123 | 1,536,685,366 |
| 0.10 | 0.01234 | 1,890,123 | 1,531,704,214 | 1,890,123 | 153,170,421 |
| 0.10 | 0.03456 | 1,890,123 | 546,910,590 | 1,890,123 | 54,691,059 |
| 0.10 | 0.08765 | 1,890,123 | 215,644,381 | 1,890,123 | 21,564,438 |
| 0.10 | 0.25000 | 1,890,123 | 75,604,920 | 1,890,123 | 7,560,492 |
| 0.10 | 0.95000 | 1,890,123 | 19,896,032 | 1,890,123 | 1,989,603 |
| | | | | | |
| 0.25 | 0.00123 | 1,890,123 | 6,146,741,463 | 1,890,123 | 1,536,685,366 |
| 0.25 | 0.01234 | 1,890,123 | 612,681,686 | 1,890,123 | 153,170,421 |
| 0.25 | 0.03456 | 1,890,123 | 218,764,236 | 1,890,123 | 54,691,059 |
| 0.25 | 0.08765 | 1,890,123 | 86,257,752 | 1,890,123 | 21,564,438 |
| 0.25 | 0.25000 | 1,890,123 | 30,241,968 | 1,890,123 | 7,560,492 |
| 0.25 | 0.95000 | 1,890,123 | 7,958,413 | 1,890,123 | 1,989,603 |
| | | | | | |
| 1.00 | 0.00123 | 1,890,123 | 1,536,685,366 | 1,890,123 | 1,536,685,366 |
| 1.00 | 0.01234 | 1,890,123 | 153,170,421 | 1,890,123 | 153,170,421 |
| 1.00 | 0.03456 | 1,890,123 | 54,691,059 | 1,890,123 | 54,691,059 |
| 1.00 | 0.08765 | 1,890,123 | 21,564,438 | 1,890,123 | 21,564,438 |
| 1.00 | 0.25000 | 1,890,123 | 7,560,492 | 1,890,123 | 7,560,492 |
| 1.00 | 0.95000 | 1,890,123 | 1,989,603 | 1,890,123 | 1,989,603 |

Figure 7

| | NEW GAME METERS (1601) | CHANGE (1602) | PRIOR GAME METERS (1603) |
|---|---|---|---|
| GAMING DEVICE ID | 732 (16011) | | |
| GAME NUMBER | 1 (16012) | | |
| BUSINESS DAY | 19970306 | | |
| BIG JACKPOT WIN NUMBER | 528 (16014) | | |
| LITTLE JACKPOT WIN NUMBER | 1497 (16015) | | |
| CURRENCY | CANADA (16016) | | |
| CONTR PCT FACTOR | .0234 (16017) | | |
| GAMES PLAYED | 1,400 | 1 | 1,399 |
| GAMES WON | 1,124 | 1 | 1,123 |
| WAGERS MADE | 5,246.25 | 3.00 (16023) | 5,243.25 |
| WINNINGS | 4,978.75 | 2.25 | 4,976.50 |

ACCUMULATED WAGERS FOR BIG JACKPOT 528 (1605A)

| CURRENCY | CONTR PCT FACTOR | WAGERS |
|---|---|---|
| CANADA | .0123 | 1,287,560.15 |
| CANADA | .0234 | 1,178,368.10 + 3.00 = 1,178,371.10 (16052A) |
| US | .0123 | 1,877,698.05 |
| MEXICO | .0213 | 8,295,223.00 |

ACCUMULATED WAGERS FOR LITTLE JACKPOT 1497 (1605B)

| CURRENCY | CONTR PCT FACTOR | WAGERS |
|---|---|---|
| CANADA | .0234 | 329,736.00 + 3.00 = 329,739.00 (16052B) |
| US | .0123 | 199.248.25 |
| MEXICO | .0213 | 722,965.00 |

Figure 16

ACCUMULATED WAGERS FOR BIG JACKPOT 528

| CURRENCY | CONTR PCT FACTOR | WAGERS (1701) |
|---|---|---|
| CANADA | .0123 | 1,287,560.15 |
| CANADA | .0234 | 1,178,371.10 |
| US | .0123 | 1,877,698.05 |
| MEXICO | .0213 | 8,295,223.00 |

CONVERSION OF ACCUMULATED WAGERS TO CURRENT PRIZE VALUE 1,000,000.00 — 1702

CANADA (( 1,287,560.15 * .0123 ) * .7484 ) * .35 = 4,148.34
CANADA (( 1,178,371.10 * .0234 ) * .7484 ) * .35 = 7,222.03
US (( 1,877,698.05 * .0123 ) * 1 ) * .35 = 8,083.49
MEXICO (( 8,295,223.00 * ..0213 ) * .126612 ) * .35 = 7,829.81

1703

1,027,283.67 — 1704

EXCHANGE RATES — 1705

| FROM \ TO | CANADA | US | MEXICO |
|---|---|---|---|
| CANADA | 1 | .7484 | |
| US | 1.3385 | 1 | 7.8890 |
| MEXICO | | .126612 | 1 |

Figure 17

PROGRESSIVE SYSTEM AND METHODS

CROSS REFERENCE TO RELATED APPLICATIONS

This application claims the benefit of U.S. Provisional Patent Application No. 60/300,333, filed Jun. 22, 2001. This application is also a continuation-in-part of application Ser. No. 09/698,941, filed Oct. 27, 2000, which is now U.S. Pat. No. 6,435,968. Application Ser. No. 09/698,941 is a divisional application of 09/005,341, filed Jan. 9, 1998, which is now U.S. Pat. No. 6,241,608. Application Ser. No. 09/698,941 claims priority of provisional patent application No. 60/035,513, filed Jan. 15, 1997, application No. 60/040,982, filed Mar. 17, 1997, and application No. 60/050,971, filed on Jun. 19, 1997.

FIELD OF INVENTION

This invention relates to system and methods used to link devices to prizes and control the participation for prizes. More particularly, the system and methods enable devices that accept wagers, payments for goods or services, or any other monetary transaction, and devices capable of using different currencies or using different denominations within a particular currency to participate for common prizes.

BACKGROUND

Prior art related to progressive prizes generally utilize gaming devices that typically contain one or more games that can be played for various prizes. Each game has a pay table that consists of one or more pay lines defining all possible outcomes of one play of the game that can result in awarding a prize to a player. A particular game's theoretical pay out percentage, also known as payback percentage, can be mathematically computed from the pay table. The computation compares the prize values for each pay line and the odds the player has to win the prize, to the theoretical sum of all wagers that would need to be played to reach every possible outcome. These concepts are described in detail in Dwight and Louise Crevelt's book *VIDEO POKER MANIA!!*

The theoretical pay out of different gaming devices may vary considerably. This is particularly true when the class of gaming devices include games such as 21, keno, bingo, roulette, and others where the theoretical pay out is dependent on items such as a deck of cards, the selection of a set of numbers from a superset, etc.

When a gaming device is linked to a progressive prize it is traditionally expected to contribute a portion of its wagers to the progressive prize. In all known prior art, the contribution percent factor is a part of the progressive prize's attributes. This results in the same contribution percent factor being applied to the wagers made on every linked gaming device.

From the perspective of the progressive prize, the sum of all the wagers made on all the linked gaming devices for each theoretical prize award is known as the prize's total wager amount. The contribution percent factor represents the portion of the prize's total wager amount that then determines the progressive prize value. For example if the average prize award were anticipated to be $1,500,000 and the percentage of wagers used to support the prize value were 1.5%, then the prize's total wager amount needed to support the prize value would be $100,000,000. In this example, any gaming device linked to this prize would need a pay line that has a total wager amount of $100,000,000, the pay line's total wager amount being the product of the wager value times the odds of winning. This ensures all participants participating for the prize make the same theoretical monetary investment to win the prize.

The oldest progressive prize computer systems support one progressive prize and require all participating gaming devices to have the same wager amount and odds for winning. This effectively satisfied all the requirements of the progressive prize to game linkage. In these systems, linkage is accomplished by physically connecting a particular gaming device to the network controlled by the progressive prize's computer systems.

Large progressive prize values proved to be a significant attraction for players. However, the limitation presented by the corresponding large total wager amount drove an industry desire for methods that would enable increasing the base of participating gaming devices. The more gaming devices that can be linked to a progressive prize, the easier it is to satisfy the prize's total wager amount thus resulting in timely prize awards that promote more player attraction.

One apparent solution, judging from patent history, was to invent methods that would enable gaming devices that used different denomination coins to participate for a common prize. For example, instead of being limited to linking a few dollar games in a casino to a progressive prize, multiple denomination methods could theoretically enable any denomination game to be linked to a common prize. This increases the participation base and enables the prize to reach its total wager amount more easily. At the same time it overcomes a casino's apprehension towards dedicating too much floor space to the same kind of game.

The control processes of a system illustrated in U.S. Pat. No. 5,116,055 allow gaming devices accepting different coin denominations of the same currency to be played for a common progressive prize. An Electronic Translator appears to translate the unique coin/pulse information normally generated by each game, into a set of information that results in each game making an approximately equal value of dollars to jackpot amount. The results produced by the Electronic Translator appear to make all the gaming devices look the same to the controlling computer system. Thus, this prior art appears to use the same linkage methods employed by older systems, which is accomplished by physically connecting a particular gaming device's Electronic Translator to the network controlled by the progressive prize's computer system.

U.S. Pat. No. 5,885,158 discloses methods for linking gaming devices that accept wagers of the same currency but of different denomination coins to a common progressive prize. The disclosed linkage methods mathematically determine that there is compatibility between the two distinct entities of the progressive prize and the gaming device. This effectively creates a second level of linkage that further qualifies which progressive prizes a gaming device may participate in once it is physically linked to the progressive prize's computer system. While these methods appear to enable increasing the participation base, they have several limitations. For example, one limitation requires that the coin wagered on a gaming device must be a multiple of the coin the prize is based upon. This would prevent a quarter gaming device from participating for a prize based on a one-dollar denomination.

U.S. Pat. No. 6,241,608 discloses a free play apparatus and methods that use a progressive prize's total wager amount and a gaming device's wager amount to compute the odds of a participant winning a progressive prize. The disclosed linkage methods enable the free play apparatus' logic to get a progressive prize's total wager amount via a logical linkage. Once physically linked to the computer system the free play apparatus receives the total wager amounts of any prizes that have been logically linked to it. It then enables the gaming device to participate in the progressive prizes. While this invention effectively eliminates restrictions related to the denomination or currency of a wager, it does nothing to address the limitation related to the potential conflict between a prize's contribution percent and a game's theoretical pay out percentage.

As previously stated, a gaming device connected to a progressive prize has traditionally been expected to contribute a portion of each wager to the progressive prize. It is well known that the contribution percent factor is a part of the progressive prize's attributes. This results in the same contribution percent factor being applied to every linked device. A particular device may have a very high theoretical pay out such as 98%, which pays out on average, 98 dollars for every 100 dollars wagered on this device. The size of the prize's contribution percent factor may hinder the ability to link the device to the progressive prize. The reason is if the progressive prize's contribution percent factor were a value of 2% or more, then it would be impossible to make a profit on a game with a theoretical pay out of 98% or more. This would effectively prevent the device from being linked to that prize.

There exists a need to enable the contribution percent factor to be a part of each device's attributes. Each device could then have a contribution percent factor that is compatible with the device's game's theoretical pay out, thus enabling a wider variety of devices to be linked to each progressive prize. For example, devices with games having very low theoretical pay outs could afford to support a high contribution percent factor while a device with games having a very high theoretical pay out may have a low contribution percent factor. This would enable further increasing a progressive prize's participation base.

Further, there exists a need for allowing any device that accepts a monetary transaction to participate for any progressive prize. Using the methods disclosed in this invention the only device requirement for linkage to a prize would be the ability to accept a monetary transaction. The monetary transaction value may then be used for participation in a prize.

Certain embodiments of the invention incorporate these advantages by disclosing methods of linkage between prizes and devices that enable assigning the contribution percentage to a device. These methods enable any device that accepts a monetary transaction to participate for any prize.

Advantages

At least one embodiment of the present invention enables any device accepting monetary transactions to be linked with at least one prize.

At least one embodiment of the present invention enables assigning a contribution percent factor to each linked device.

At least one embodiment of the present invention enables assigning a contribution percent factor At least one embodiment of the present invention enables linking a device and prize regardless of the device's currency or denomination of monetary transaction, or theoretical payout.

At least one embodiment of the present invention expands the participation base of a prize.

As the participation base for a prize is expanded, the owner of the prize is afforded more flexibility in determining how the total contribution amount will be distributed to the monetary requirements of the prize.

These and other advantages may be realized by reference to the remaining portion of the specification claim and abstract.

BRIEF DESCRIPTION OF THE ASPECTS IF THE INVENTION

The specification discloses a progressive gaming system having a central system, at least one prize, a progressive method, and at least one monetary transaction acceptor. The central system is adapted to associate the progressive method with the prize and the monetary transaction acceptor thereby allowing the monetary transaction acceptor to participate for the prize. The progressive method is adapted to determine a participation outcome based at least on the monetary transaction acceptor's contribution percent factor.

The specification also discloses a progressive gaming system and methods having the ability to expand the participation base for a progressive prize to include a wide variety of monetary transaction acceptors. The progressive gaming system and methods may have the capability to accept a monetary transaction value in a plurality of currencies or a plurality of denominations of the same currency. The progressive gaming system and methods may support multiple prizes simultaneously. Each monetary transaction acceptor may be linked to one or more prizes.

The disclosed methods may comply with the commonly accepted requirement that each participant for a prize make the same theoretical monetary investment to win the prize. The present invention may further comprise methods used to interface various devices with progressive methods, acquire monetary transactions, control events, and others.

Additional features of the invention will be described below and will form the subject matter of claims. In this request, before explaining at least one preferred embodiment of the invention detail, it is to be understood that the invention is not limited in its application to the details of the construction and the arrangement of the components set forth in the following description or as illustrated in the drawings. The invention is capable of other embodiments and of being practiced and carried out in various ways. It is also understood that the phraseology and terminology employed herein are for the purpose of description and should not be regarded as limiting.

BRIEF DESCRIPTION OF DRAWINGS

Certain embodiments of the present invention are shown in the accompanying drawings where:

FIG. 6 is an example of a matrix of prize data.

FIG. 7 is a spreadsheet depicting odds, total contribution amounts, and total wager amounts varying with different transaction amounts and game contribution percent factors.

FIG. 16 is an illustration of the processes involved with accumulating wagers.

FIG. 17 is an illustration of the processes involved with computing a prize value.

Figure 1:
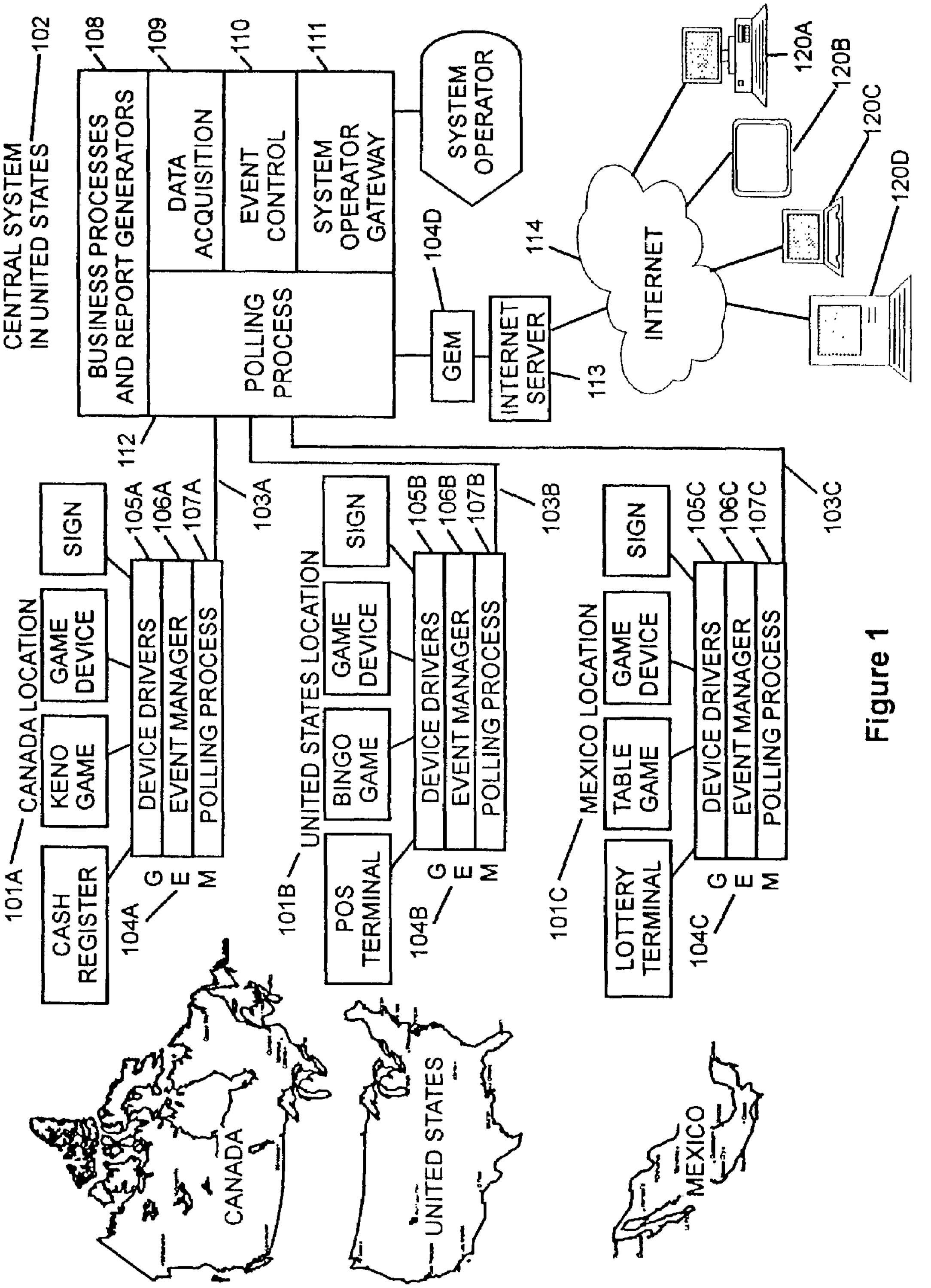
FIG. 1 is a diagram of a simple implementation of the invention to illustrate an international distribution of the system components.

| Definitions | |
|---|---|
| Acquisition Data | Data produced by devices as a result of participation for prizes. Data recorded from game meters are one example of the acquisition data. See also Monetary Transaction Value |
| Central System | One or more sets of computer hardware and software in communication with GEMs or devices, the computer hardware and software being responsible for controlling the system. |
| Contribution Percent Factor | For a prize, these are used to allocate the contributions made by devices to funds used to finance the starting value of a prize, increment the prize value, and other uses. For devices, this determines the portion of the monetary transaction value that is contributed to a prize. |
| Control Data | Data input by system operators that define the system environment, operating parameters, constraints, and other criteria. Examples include the data that defines each device, each GEM, communication criteria, prizes, logical linkage between prizes and progressive method, etc. |
| Device | An apparatus accepting wagers or payments for goods or services in a manner that enables a monetary transaction value to be used by a progressive method thus enabling participation in a prize. See also Gaming Device, Monetary Transaction Acceptor. |
| Device Driver | A set of hardware or software used to monitor and control devices. |
| Device Protocol | The set of messages used to control a specific device. |
| Distributed System | A system consisting of a plurality of sets of computer hardware and software in communication with and controlling a plurality of computers at the same site or at separated sites. |
| Event Condition | A condition arising from an incident that is either outside the set of normal incidents, or is a normal incident that requires tracking of some specific process to be performed for control or audit purposes. |
| Event Data | Data generated by the system to track each event. For example the tracking for a prize award event may include audit records recording meters that could not be gathered, the prize value displayed to the participant, the actual prize value computed after all contributions were acquired, etc. |

-continued

| Definitions | |
|---|---|
| Event Process | A process that enables a controlled response to an event condition. The objective of the event process is to ensure the situation is handled in accordance with the rules and regulations of a governing agency. Examples may include prize award events, end of day processes, malfunctioning or non-responding devices, remote computers, or other system components. |
| Game | A method or apparatus that provides a participant with the opportunity to place a wager, then interact in some manner with either a device or a house employee, such as a dealer or table operator, for the chance of winning a prize. |
| Gaming Device | A method or apparatus used as a game of chance wherein a participant may place wagers for the chance of winning prizes. Also, secondary devices that connect to primary devices, for example the progressive apparatus used as a secondary device to connect to a primary gaming device, keno games, bingo games, table games, roulette, cash registers, point of sale terminals, lottery terminals, or others. |
| Gaming Environment Manager | A set of hardware and/or software that connect the central system with the device drivers controlling devices. |
| GEM | See Gaming Environment Manager |
| Handle Pull | A gaming industry term used to indicate one play on a game, a gaming device, or other game of chance. Also includes the participant action of payment for services or goods when the payment is used in participation for prizes. |
| Host Computer | A computer acting as the controlling entity for another computer or computerized device. |
| Linked Device | A device that is linked with one or more prizes. See also Linked Game |
| Linked Game | A game that is physically, associatively, or logically linked with one or more prizes. |
| Location | A site containing devices linked to the system. For example locations include sites such as a casino, a drinking establishment, grocery stores, airport lounges, resort destinations, as well as other establishments with devices participating for prizes. May also include internet servers. |
| Monetary Transaction Acceptor | Any hardware or software that is capable of accepting a monetary transaction. Examples include a gaming device, keno games, bingo games, table games, roulette, cash registers, point of sale terminals, lottery terminals, internet transactions, and others. See also Device, Gaming Device |
| Monetary Transaction Value | The value of a monetary transaction. See also Handle Pull |
| Participant | Someone that performs a monetary transaction wherein the monetary transaction value is used to participate in a prize. |
| Participation Outcome | The win or lose outcome for each handle pull for a prize. |
| Pay Table | The data used to compute a game's theoretical payout. Usually consist of one or more pay lines that define the required wager, odds for winning, prize award, and other data. |
| Prize | Something offered as an award for participation. See also Progressive Prize |
| Prize Award | The condition that results from the win of a prize. It may also include the subsequent prize award event that ensures all rules are enforced in regards to meter collection and calculation of the final prize amount. |
| Progressive Apparatus | A secondary device that may enable a primary device to participate for prizes. |
| Progressive Method | The methods employed using computer hardware or software that enable participation in one or more prizes. |

-continued

| Definitions | |
| --- | --- |
| Progressive Prize | A prize that starts at an initial value then the prize value is incremented by a percentage of the monetary transactions made on devices linked to the prize. In some embodiments the prize value may not increment due to a zero value percentage, or even no increment percentage at all. See also Prize |
| Protocol | A set of defined messages used to communicate between system components. |
| Remote Computer | A set of computer hardware and software located at a site other than the central site. |
| System Activity Data | Data that results from participants making monetary transactions using devices linked to the system. Examples include a gaming device's meter data, point of sale data, lottery ticket purchases, and others, captured for each prize award event. |
| System Operator | People charged with the responsibility for operating the central system computers, entering control data, and ensuring event processes perform correctly. |
| System Standard Protocol | The set of defined messages used by the system to communicate between processors. Each message has a specific set of information according to its purpose. |
| Total Contribution Amount | The sum of all contributions made during the theoretical life cycle of each prize award event. |
| Total Wager Amount | For a prize, this is the theoretical sum of all wagers made for each prize award event. For a device, this is the sum of all monetary transactions made for each theoretical prize award event. |

DESCRIPTION OF THE PREFERRED EMBODIMENT

In the following detailed description of the preferred embodiment, reference is made to the accompanying drawings, which form a part of this application. The drawings show, by way of illustration, specific embodiments in which the invention may be practiced. It is to be understood that other embodiments may be utilized and structural change may be made without departing from the scope of the present invention.

One embodiment of this invention is comprised of one or more central or remote locations where devices are located. A particular location may be devoted to gaming, such as a casino, while another location may simply employ devices for the convenience of customers, for example restaurants, drinking establishments, grocery stores, airport lounges, resort destinations, as well as others. Another embodiment may include an Internet server to enable personal computers, or other web enabled devices connected to the Internet, to participate in a common prize.

In one embodiment, at each site where devices are located, one or more processors, known as Gaming Environment Managers (GEM), may be used to monitor and control each connected device or other apparatus designed to allow participants to place wagers or make payment for goods or services. Each GEM may be connected to a central system via appropriate communication lines.

Referring now to FIG. 1, in the embodiment shown, one location 101A has one GEM 104A and is located in Canada. A second location 101B has one GEM 104B and is located in the United States. A third location 101C has one GEM 104C and is located in Mexico. The central system, 102, is in the United States. Of course, the number of locations, where the locations physically exist, how many GEMs may be at one location, or where the central system may exist may vary.

The GEM 104D provides access to the central system for the Internet server 113. Web enabled devices 120A, 120B, 120C, 120D connect to the Internet server through the Internet 114. These devices run software that provides the ability to participate in wagering for prizes. Communication lines 103A, 103B and 103C connect the locations with the central system. These communication lines may be of any particular kind depending on the capability of an international location's existing facilities.

Each GEM may contain device drivers 105A for monitoring and controlling the attached devices, an event manager 106A, and a polling process 107A. The polling processes may coordinate the sending of transactions to and from the polling process 112 at the central system 102. The event managers may process each transaction from the central system and create transactions to be returned to the central system. The device drivers may monitor and control each device or apparatus and may perform the data acquisition to record data indicative of wagering activity, payment transactions, and events generated from each device.

The central system may contain the business process and report generation functionality 108 responsible for maintenance of all information used to define the physical system, including all devices, games, prizes, linkage of devices and games to prizes, currency exchange rates and other data needed by the operating logic. The central system may coordinate this information across the computer hardware platforms to ensure accuracy and consistency. In the preferred embodiment, the central system is the central repository and distribution point for all data acquired by the system.

The polling process 112 may be responsible for scheduling polls to each GEM, transporting the transactions generated by the other central system processes to the GEM, then receiving transactions from the GEMs and passing them to the data acquisition process 109. The data acquisition process may be responsible for accumulating the records of wagering and payment activity that occur on each device, applying wagers, payments, and/or contributions towards prizes, computing prize amounts, and maintaining the memory tables used by all other elements of the central system to control processes. As event transactions are acquired they are passed to the event control process 110.

The event control process 110 may be responsible for monitoring the progress of events and creating messages needed to affect decisions to carry out or terminate operations. The system operator interface process 111 may serve as a gateway for the system operator to monitor the operational performance of the system and issue commands. Once the system is operational, the normal day-to-day control functions may include but are not limited to, adding and removing prizes, adding and removing equipment and communication lines, controlling the collection of wagering and payment activity, contribution percent changes, exchange rate changes between currencies, and ensuring all events are handled properly. There may be a daily process that reconciles the participant wagering and customer payment activity for the day and balances all financial activity. All activities may be monitored and controlled by the central system processes.

To ensure all system activity is controlled on a standard time of day and day of year basis, all system processors preferably operate on Greenwich Mean Time or some other system standard time. The system standard time is coordinated during the continuous polls from the central site to the local and remote sites. Local presentation of time of day and day of year may be produced via methods that convert the system standard time to the local standard time of the particular location based on time zones, daylight savings criteria, or other criteria that may be in effect for a particular location.

Figure 2:
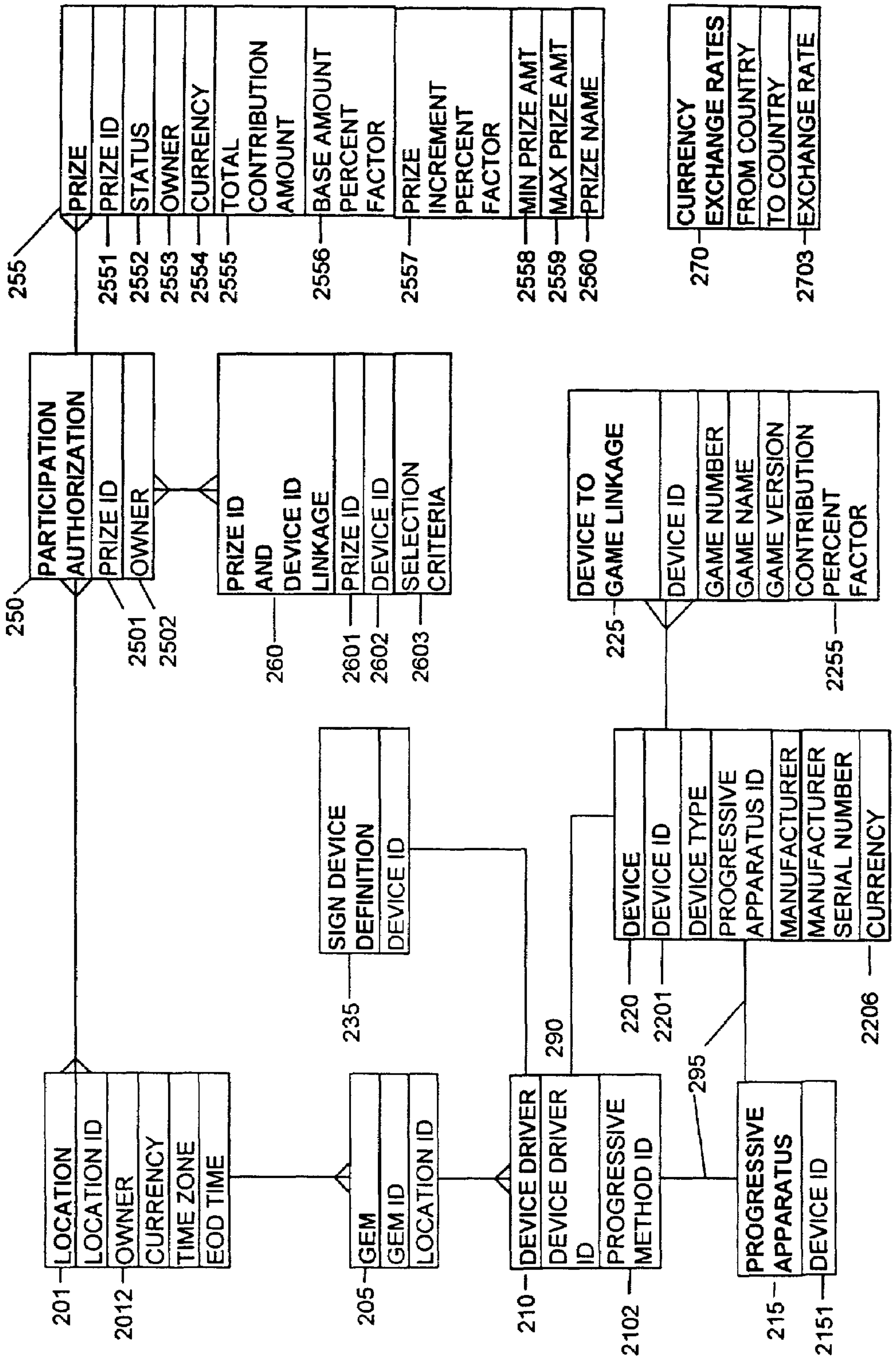
FIG. 2 is a simplified entity diagram of the data used to describe the control processes of the invention.

FIG. 2 is a simplified entity relationship diagram used to demonstrate how system data of one possible embodiment is related. When the line connecting entities has a crow's foot on its end, it means there may be one or more instances of that entity available to relate to the other entity. When the line simply connects to an entity, it means there may only be one instance available. For example, the relationship between location 201 and GEM 205 indicates that for one location there may be one or more GEMs.

In the preferred embodiment, Prize data 255 may be the first data entered. Location data 201 may be entered for each physical site where devices are located. There may be an owner of each prize 2553 that preferably enters into an agreement with the owner of a location 2012. The agreement may be approved by the regulatory agency before the location owner can be authorized for participation 250. Once this data is defined to the system, the remaining data may be entered to define each GEM 205, each device driver 210, each progressive apparatus 215, each device 220, and if the device contains games, each game on a device 225.

In the most preferred embodiment, the ability to provide a participant using a device with the opportunity to win a prize may be built by associating each prize's Prize ID 2601, each device's device ID 2602, and defining any selection criteria that governs the display of the prize to a participant 2603. Other databases known in the art may be used in practice to drive the data requirements of a progressive system.

In the preferred embodiment, when a participant uses a device to participate in a prize, a progressive method may be used to determine the outcome. The method may be incorporated into a device driver 210, a progressive apparatus 215, a device 220, or a game 225. The steps of the method may also be separated and spread out amongst these entities. Some of the steps in the methods may even be incorporated into the software of the central system itself by utilizing the various prize and device IDs to determine when and where participation for a prize may occur, the anticipated contribution percent factors, the anticipated monetary transaction values, as well as other data. The progressive method may be incorporated into a device and the relationship between the device driver and the device may take the route indicated by line 290. In embodiments where the progressive method is incorporated into a secondary device, such as a progressive apparatus, the relationship between the device driver and the device may take the route indicated by lines 295.

For ease of explanation, unless otherwise noted, the description of the preferred embodiment assumes the progressive method is incorporated into a device 220. As devices are defined to the system they may be associated with a device driver. The general functions of a device driver are explained referencing FIG. 1. The polling process 107A receives transactions from the central system polling process 112 and passes them to the event manager process 106A. The event manager process either carries out the commands contained in the transaction, or it may pass certain commands directly to the device drivers for action. The device driver either carries out the command or converts the command to the unique format required by the particular device. The device driver then periodically polls the device, sending system messages to the device for action. The device responds to the poll with messages it has queued. The device driver converts the device's messages into the system format and queues them for sending to the central system. As the polling process 107A is polled by the central system 112 it packages any transactions prepared by the event manager or device drivers and sends them to the central system.

In addition to isolating the central system from the physical devices, the device drivers may be responsible for qualifying each set of acquisition data and event data with the appropriate prizes' win number, currency, and other required prize data along with the currency, contribution percent factor, and other required data.

The disclosures of the methods of certain embodiments of this invention are presented starting with the progressive method, followed by several embodiments illustrating how the progressive method may be incorporated into various devices and games. This is followed by the disclosure of the method used to link a progressive method to a prize. The methods used to accumulate monetary transactions, compute prize values, process a prize award event and the accumulation of monetary transactions and payments during a prize award event are presented last.

The progressive method may be incorporated into many different embodiments. In one embodiment a standard set of prizes may be displayed to the participant. In another embodiment different sets of prizes may be displayed to participants based upon criteria such as player rating, monetary transaction amount, special promotions, or any other criteria that enables sets of prizes to be distinct from other sets of prizes. In another embodiment the participant may be allowed to select one or more prizes from lists of several prizes. In another embodiment the device may randomly select prizes for presentation to the participant. Other embodiments may contain combinations of these preferred embodiments.

Figure 3:
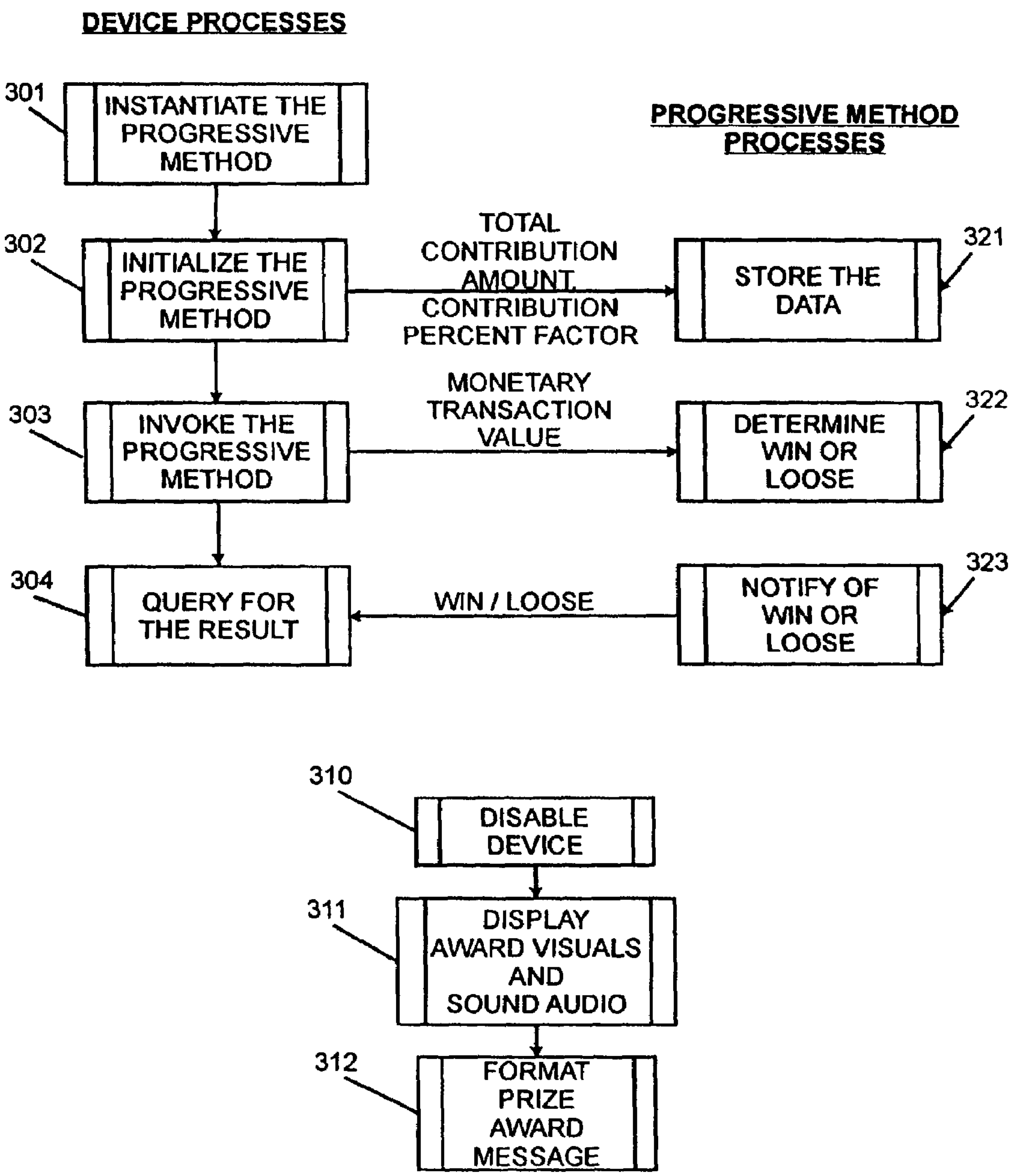
FIG. 3 is a flow chart presenting the interface between a device and a progressive method.
Figure 4:
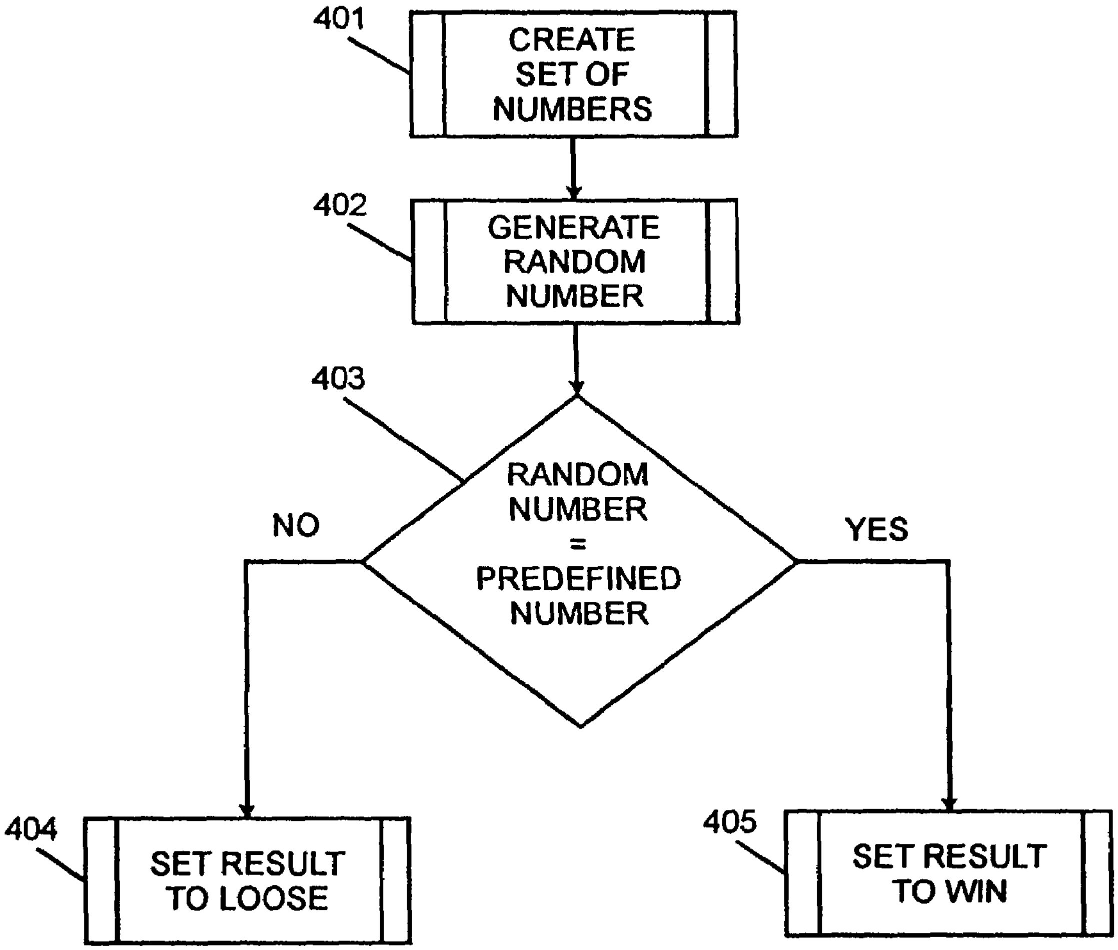
FIG. 4 is a flow chart of one embodiment of the progressive method functionality.

FIG. 3 illustrates one embodiment wherein a device interfaces with the progressive method's logic to enable the participant to participate for one prize. When the device is started, it would preferably first interact with its device driver and perform the device initialization. The specific initialization process may be dependent on the type of device and may include the steps required to make the device aware of the prize ID, the prize's total contribution amount, the device's contribution factor, and any selection criteria for display to a participant. Sometime during the initialization, the device may instantiate the progressive method 301, and thus making the method's logic and data available. Once the progressive method is instantiated, it may be initialized by loading it with the prize's total contribution amount and the device's contribution factor 302. The progressive method may then store the data in its memory space 321. When the device detects a monetary transaction it may invoke the progressive method to determine a win or lose outcome 303, passing it the monetary transaction value. The progressive method may determine a win or lose outcome 322 using a series of steps illustrated in FIG. 4. The first step creates a set of numbers 401 for the random number generator using the following equation:

$$MR = \frac{PC}{MV * DC}$$

where

MR=Maximum number for the range of random number selection

PC=Prize's total contribution amount

MV=Monetary value

DC Device's contribution percent factor

The progressive method may then generate a random number 402 from the range of 1 through the maximum number for the range as computed. The generated number may then be compared to a predefined number 403, such as the number one "1"). If the numbers were different then the result is set to lose 404. Otherwise the result may be set to win 405.

While this method for determining outcome is a preferred embodiment, other embodiments may take other forms. For example, other data may be used in place of the prize's total contribution amount:

$$MR = \frac{TW * PP}{MV * DC}$$

where

MR=Maximum number for the range of random number selection

TW=Prize's total wager amount

PP=Prize's contribution percent factor

MV=Monetary value

DC=Device's contribution percent factor

In this embodiment, the algorithm TW*PP replaces the prize's total contribution amount. In other embodiments, the contribution percent factors may be replaced by the sum of several different factors such as:

$$MR = \frac{TW * (BAP + PIP + POP + OPP)}{MV * DC}$$

where

MR=Maximum number for the range of random number selection

TW=Prize's total wager amount

BAP=Prize base amount percent factor

PIP=Prize increment percent factor

POP=Prize overhead percent factor

OPP=Any other undisclosed prize percent factors

MV=Monetary value

DC=Device's contribution percent factor

As can be seen, there are many permutations of algorithms that may be used to create the maximum number for the range of random number selection. The data requirements for each permutation may be easily defined to the system database and then sent to the progressive method at the time of initialization, and at any other time during the course of operation as needed to keep the progressive method's data current and up-to-date.

Once the progressive method has determined an outcome, the device's processes may query the progressive method for the result 304. The progressive method may then notify the device of the outcome 323.

In various embodiments, certain features of the progressive method may be built into different system components. For example, if the monetary transaction of some devices were always of the same value and in the same currency, the central system may have access to all the data needed to create the maximum number for the range of random number selection. Therefore, for those devices the central system may be able to compute the maximum number range and just send that value to the progressive method.

In other embodiments, all or part of the features of the progressive method may be incorporated with the logic and processes of the device itself thus eliminating the progressive method as a distinct class or entity.

Once it is determined that a prize win has occurred, other methods may be invoked. For example, the regulatory agency may require the device be disabled after a prize is won 310, there may be requirements to display visual and audio signals to the participant indicating they have won 311, prize award messages may need to be formatted and sent to the central system 312, as well as other requirements depending on the particular venue in which the device is located. All of these methods may be incorporated into the device itself, the progressive method, or other entities such as an event class.

Figure 5:
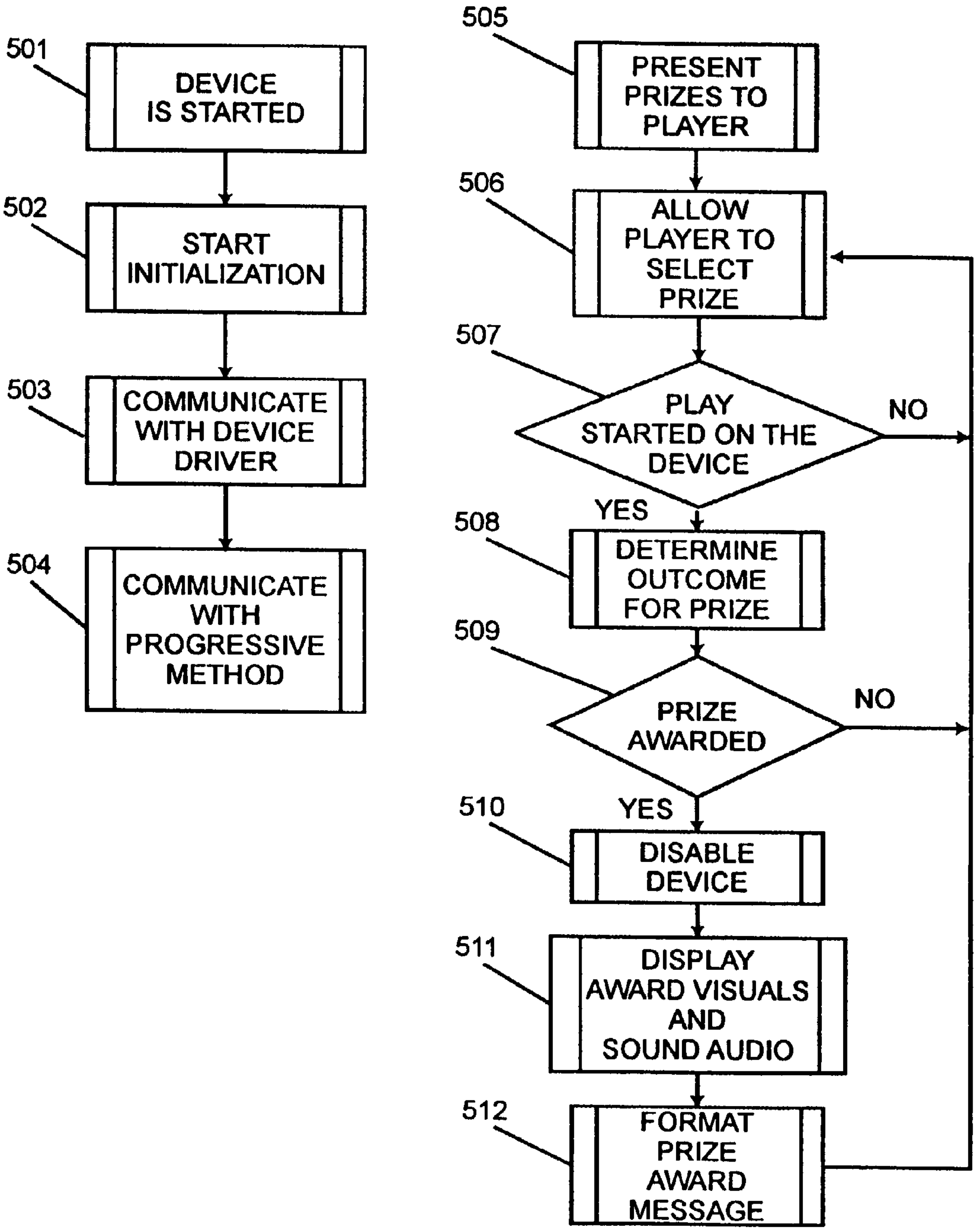
FIG. 5 is a flow chart illustrating one embodiment of the progressive method functionality as incorporated into a gaming device.

Several other embodiments of devices that incorporate the progressive method follow. FIG. 5 presents the methods that may be used by a device that enables a participant to select from many different prizes. Once the device is started 501, it may go through an initialization process 502. When the device determines it is in functioning order, it may communicate with its device driver 503 then instantiate and initialize the progressive method 504. When the device includes more than one prize, there may be several embodiments of processes that may be used to store the prize data. Preferably, the device's processes include the logic needed to instantiate a separate progressive method for each prize. In this preferred embodiment, the device may incorporate a matrix for the prize data as illustrated in FIG. 6. While FIG. 6 includes 5 different prizes, there may be no practical limit on the number of prizes a device may be linked to or on the data that may be associated with a prize and kept in the matrix.

The device logic may use the data illustrated in FIG. 2 to determine which prizes were linked to it. For example, the prize name 2560 may be obtained by first finding the set of prize IDs 2551 linked to the device by browsing the prize ID and device ID linkage table 260 using the device's device ID 2201, 2602 value and selecting all the prizes linked to it by prize ID 2601, 2551. However, other methods may be employed that may use one progressive method to keep track of all the prizes.

Referring to FIG. 3, more data may be required to be passed between the device processes and the progressive method processes in several different steps. Once the device has finished initializing itself, it may enable participants to begin using it. When a participant starts using the device, there may be several different methods used to select the prizes to be displayed 505. If the device is capable of accepting the participant's player tracking ID, then there may be a player rating assigned. Display of prizes may also be conditioned on the wager amount. For example, if the player rating were greater than 4 and the monetary value of the transaction were more than 2.99, then using the matrix in FIG. 6, there may be 4 prizes presented to the participant-Big Bonanza, Super Hits, Free And Clear, and Get Away. This determination may be made based on the selection criteria in the matrix.

The selection criteria are presented as an example only. In practice the criteria would be more comprehensive to enable greater flexibility in the selection of prizes. In some embodiments the selection criteria may consists of layers of criteria. For example, the participant may select a category of prizes such as Vacations, Vehicles, etc. Then the participant may select items from the selected category such as Paris, London, New York, San Francisco, etc. from the Vacations category.

Once the device has displayed the prizes 505, it may enable the participant to select a prize 506. In the embodiment wherein the participant is not allowed to select a prize, step 506 may not exist and the participant may be allowed to participate in all the prizes displayed. A control method may actively monitor the device 507 to detect a handle pull at the instant it occurs. As soon as it is detected, the progressive method may be used to determine the outcome for each selected prize 508. If the play results in a prize award event 509, the control methods may then disable the gaming device 510, create the appropriate visual and audio output to notify the participant of the prize award 511, and generate a prize award event for the central system 512.

FIG. 7 illustrates the results that may be produced when a progressive method is attached to or incorporated into devices with various monetary transaction values and contribution percent factors. In this example, the currency values in column A TRANSACTION VALUE, column C PRIZE'S TOTAL CONTRIBUTION AMOUNT, column E COMPUTED TOTAL CONTRIBUTION AMOUNT and column F COMPUTED TOTAL WAGER AMOUNT do not represent any particular currency. The values may be US, Canadian, Mexican, or any other county's currency. Column A TRANSACTION VALUE is the monetary transaction value. Column B CONTRIBUTION PERCENT FACTOR is the contribution percent factor assigned a particular game. For ease of illustration the contribution percent factors for each game denomination, 0.05, 0.10, 0.25 and 1.00 are same. Contribution percent factors may be different for each game denomination.

Column C PRIZE'S TOTAL CONTRIBUTION AMOUNT represents the amount of money to be contributed to a prize over the theoretical life cycle of one prize award event. Statisticians who use a variety of factors may create the value themselves. In very simple terms, the value represents the amount of money that may be needed to fund the starting prize value, fund the increment of the prize value, fund profits for the owner of the prize and many other financial requirements. In this case, the value 1,890,123, stored in the prize's data element TOTAL CONTRIBUTION AMOUNT 2555 on FIG. 2, may be for a prize that starts with a $1,000,000 value and, on average, may increment by $750,000 when the prize would be won. This may make the average prize win worth $1,750,000. The funding for the prize's starting value may be represented by the value of 0.5291 in the prize's data element BASE AMOUNT PERCENT FACTOR 2556, meaning 52.91% of all contributions go to funding the base amount. The funding for the prize's increment value may be represented by the value 0.3972 in the data element PRIZE INCREMENT PERCENT FACTOR 2557, meaning 39.72% of all contributions go to funding the increment amount. In this very simplified example, the profit may be realized by the remaining percent factor of 0.0737. These percent factors may not be recorded as part of the prize's data, but instead may be known parts of a manual accounting process that keeps track of contributions and their use. There may also be many more percent factors allocating contributions to many different purposes.

Column D COMPUTED ODDS illustrates how the odds computed by the progressive methods vary according to the monetary transaction value and the game's contribution percent factor. It is apparent that as either value grows, an indication that the participant is contributing more to the prize, the odds become smaller, giving the participant a better chance at winning the prize. Column E COMPUTED TOTAL CONTRIBUTION AMOUNT illustrates that regardless of the transaction value or the value of the game's contribution percent factor, each participant will ultimately contribute the same amount for the chance of winning the prize. The varying odds are the factors that make this possible. Column F COMPUTED TOTAL WAGER AMOUNT illustrates that the actual value of the wagers made over the theoretical life cycle of one prize award event may vary considerably.

Figure 8:
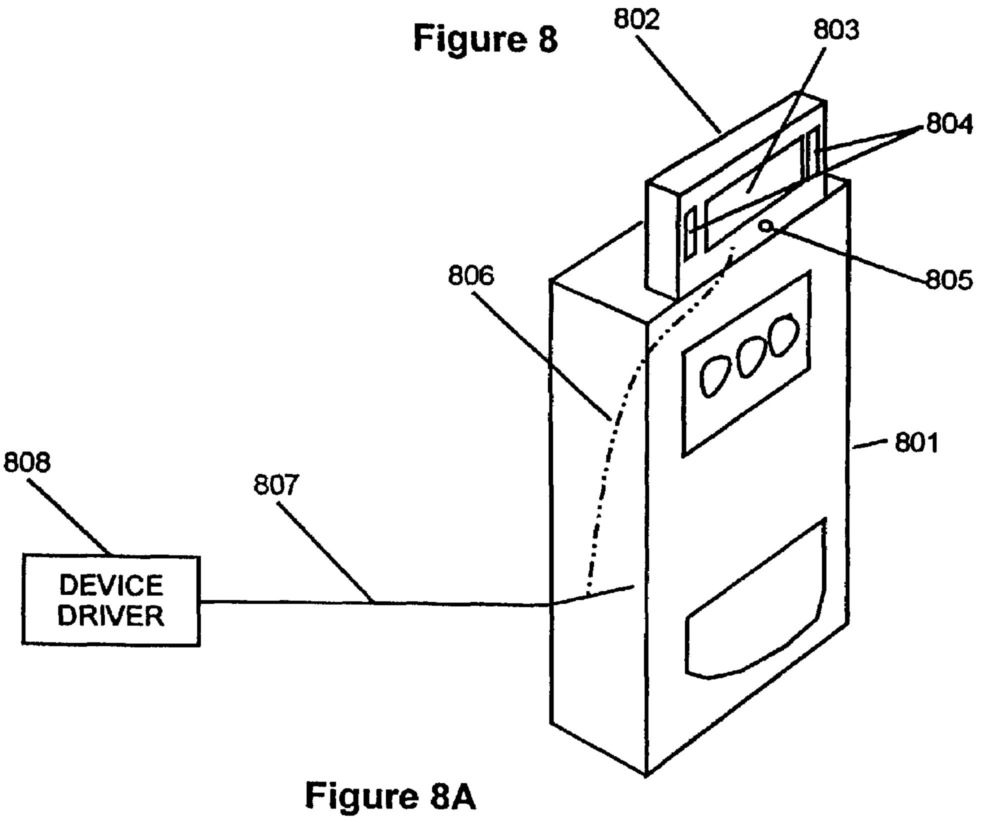
FIGS. 8 and 8A are diagrams explaining the progressive method incorporated into a secondary apparatus that is connected to primary gaming devices.

FIG. 8 illustrates an embodiment wherein the progressive method may be incorporated into a secondary device such as a progressive apparatus. In this embodiment, the progressive apparatus 802 may be comprised of a standard processor board, a video display 803, and speakers 804. The secondary device may be mounted on top of a gaming device 801 with the communication and power supply lines 806 contained inside the gaming device's cabinet. In other embodiments, the progressive apparatus may take on different outward physical characteristics required to connect to various gaming devices or other types of monetary transaction acceptors.

The progressive apparatus' communication line may be connected to the device driver's communication line 807. The connection may be direct, in which case the progressive apparatus may perform all communications between the device driver 808 and the gaming device 801, or the connection may be made with a standard communication line adapter used to split the signal, in which case the progressive apparatus may perform only the communications related to progressives. Communications from the progressive apparatus to the device driver may have event messages indicating prize awards, intruder events, malfunction events and response messages.

Figure 8A:
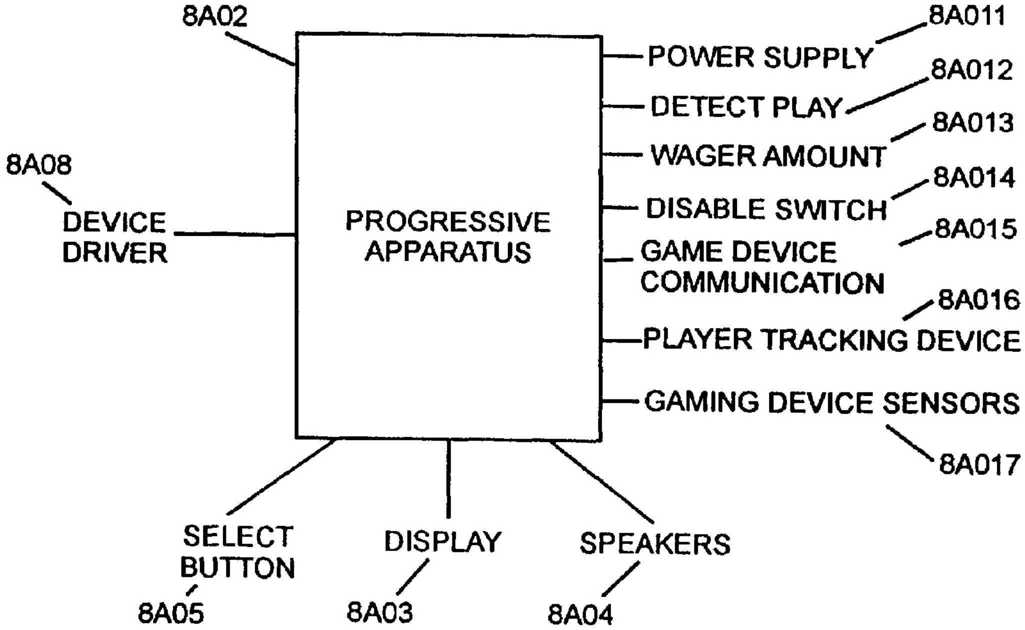

FIG. 8A describes the manner in which the progressive apparatus in this embodiment may provide connections with its external interfaces. The progressive apparatus 8A02 may be powered by a connection to the gaming device's power supply 8A011. It may exchange messages with the device driver using a communications line 8A08. Instructions that enable the incorporated progressive method to allow participants to select prizes may be received from participants pressing a selection button 8A05. Messages may be sent to participants via the display connection 8A03 and/or the speaker connection 8A04.

The functionality of the incorporated progressive method may be driven from connections to the gaming device. When a participant initiates play by pulling a handle, pushing a button, or some other means as dictated by the gaming device, an impulse may be generated on the connection 8A012. The amount of the wager made may be obtained from connection 8A013. Sending the appropriate signal through the connection 8A014 may disable the gaming device. If the progressive method has a direct connection to the device driver, then the connection 8A015 may be used to send central system messages to the gaming device and also to receive messages from the gaming device to be sent to the central system.

If the gaming device had an attached player-tracking device, communication line 8A016 may be used to provide the interface between the device and the central system. The progressive apparatus may also be connected to the various sensors incorporated in the gaming device that detect opening of doors, tilting of the device or any other security related events through one or more connections 8A017. All the connections illustrated in FIG. 8A may be replaced with other connections as dictated by the regulations of various regulatory agencies and depending on the particular kind of device it is attached to. However, the essence of the preferred embodiment of the progressive method's functionality when incorporated into a secondary device such as a progressive apparatus would remain regardless of the physical connections.

Figure 9:
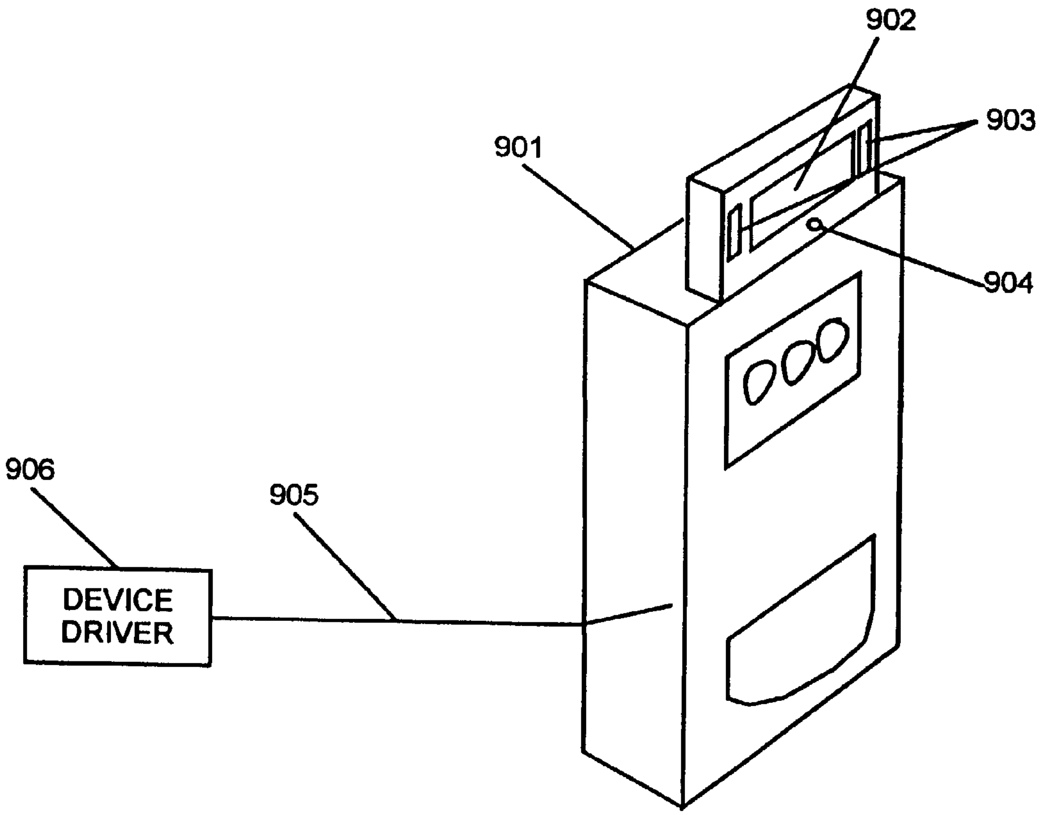
FIG. 9 is a diagram depicting a gaming device with the progressive method incorporated into the game.
Figure 10:
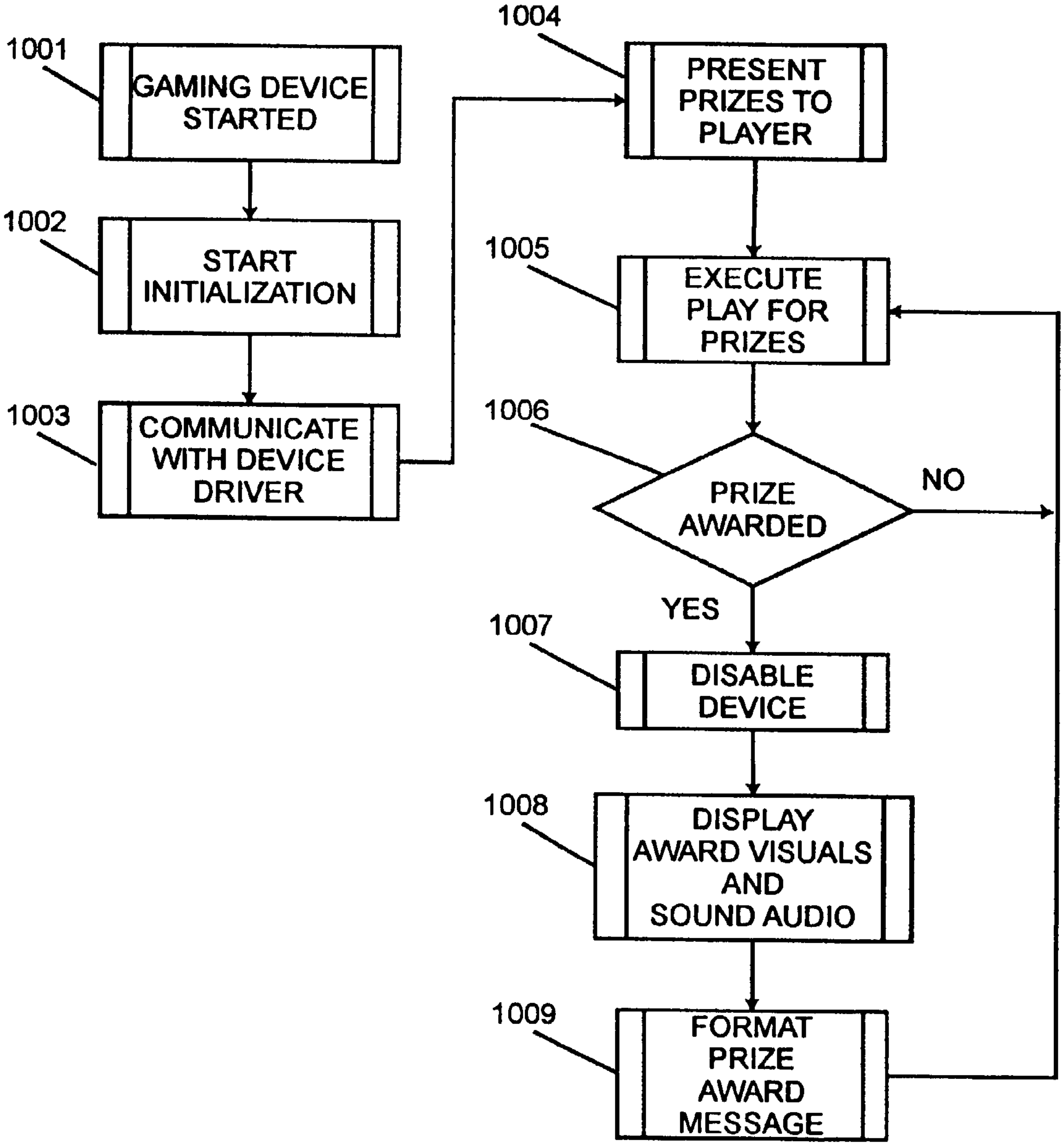
FIG. 10 is a flow chart illustrating the processes when the progressive method is incorporated into the game.

FIG. 9 illustrates an embodiment wherein the progressive method is incorporated into the device itself. In this embodiment, a gaming device 901 has a video display 902, speakers 903, and a button 904 for the participant to select a prize. The gaming device's communication line may be connected to the device driver 906 with a communication line 905. Due to the extraordinary variety devices that comprise monetary transaction acceptors, the various device that could be used to incorporate the progressive method are literally unlimited. One simple example that illustrates the ease with which this can be accomplished is the flow chart presented in FIG. 10. This is one example of how a gaming device may operate. This can compare with the flow chart in FIG. 3 that contains a simple example of the progressive method's processes as they may be controlled by some unspecified device.

The methods used to start the gaming device 1001 and perform initialization 1002, may incorporate the process of instantiating and initializing the progressive method 301, 302. To execute play for the prizes 1005, the gaming device may invoke the progressive method 303 then query the progressive method for the win/lose outcome 1006, 304. In any slot machine type gaming device or other device accepting monetary transactions, there are a multitude of other steps the device is required to perform. This example is not an attempt to be all encompassing; it is presented as only one example of how the progressive method could be incorporated into a slot machine type of gaming device by someone of ordinary skill in the art.

Figure 11:
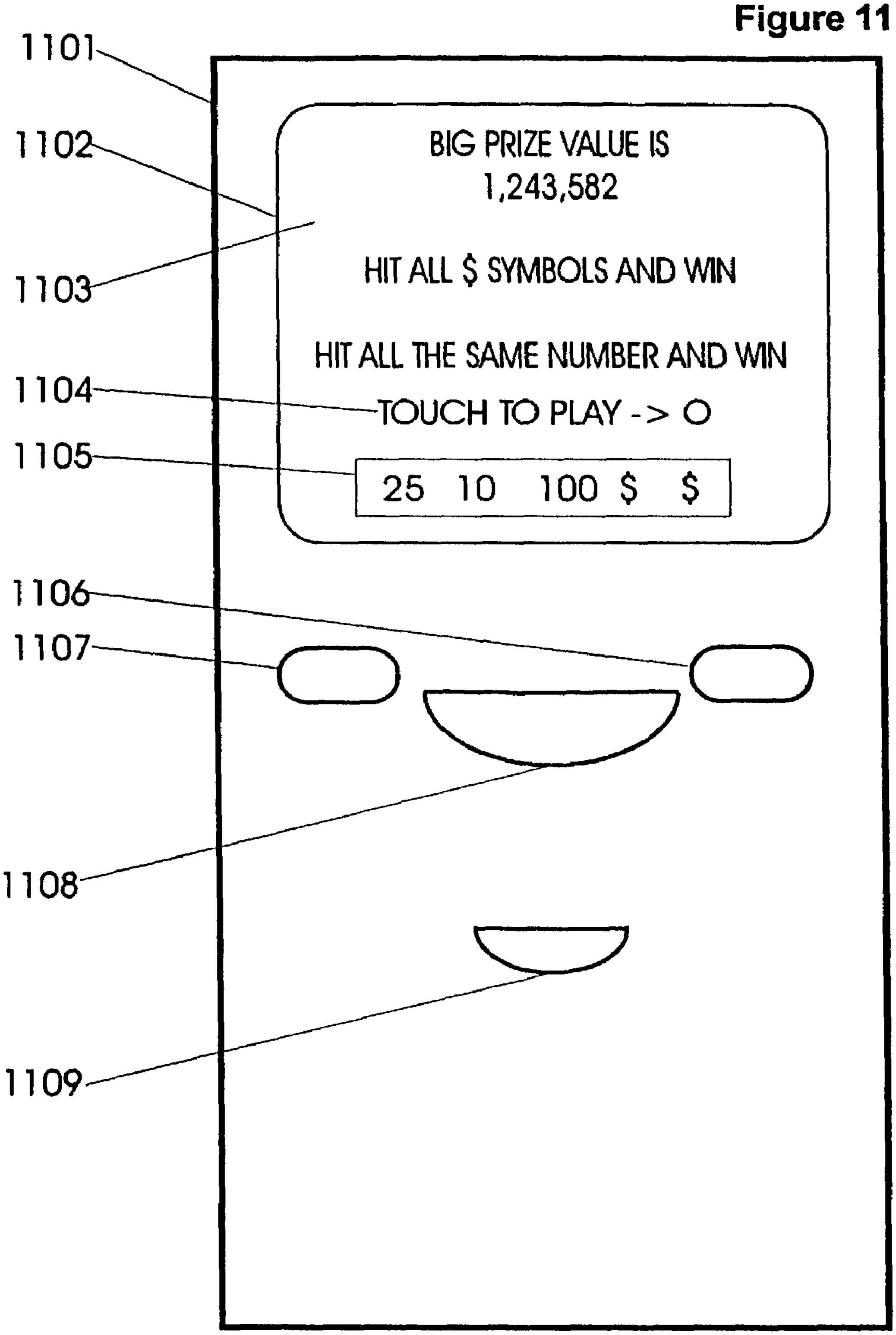
FIG. 11 depicts a gaming device that accepts any wager amount and incorporates the progressive method.

FIG. 11 illustrates an embodiment of a progressive method incorporated into another type of gaming device. This gaming device 1101 accepts wagers of any kind in a coin hopper 1108 and/or a bill acceptor 1106. The gaming device in this embodiment has one big prize and several small prizes linked to it. If the big prize is won, the gaming device creates a prize win event that results in the prize being paid by attendants. If a little prize is won, the gaming device prints a coupon and dispenses it from the coupon dispenser 1107.

As indicated in the text displayed 1103 on the monitor 1102, when the participant initiates play by pressing a button 1104, the gaming device may execute play for each prize and display symbols 1105 to indicate a win or a loss outcome. In the event the participant tosses invalid coins into the coin hopper, those invalid coins may be returned in the return hopper 1109.

Figure 12:
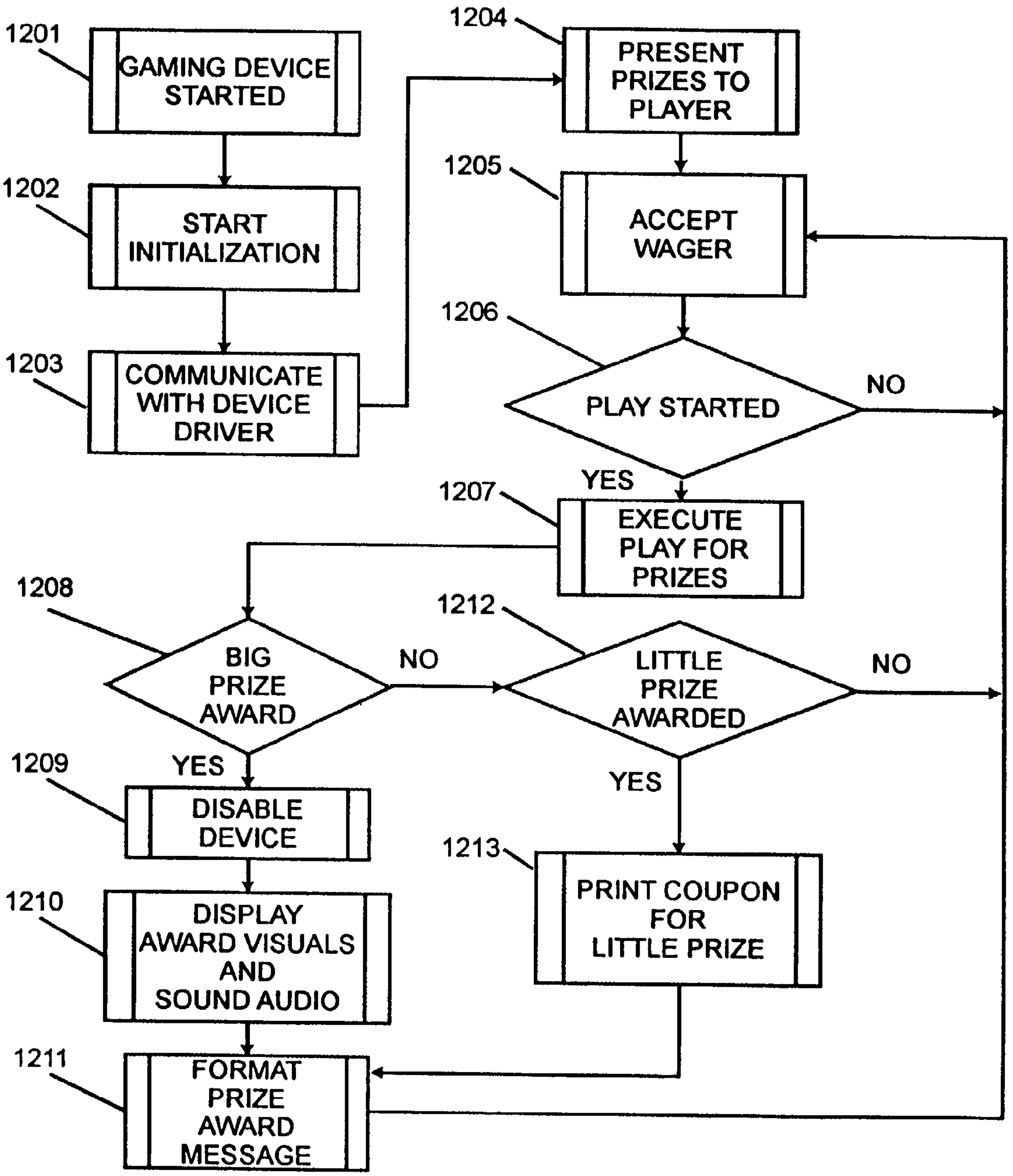
FIG. 12 is a flow chart illustrating the process of the gaming device depicted in FIG. 11.

FIG. 12 depicts a flow chart to illustrate the steps this gaming device, incorporating the progressive method, may use to process a participants monetary transaction. The gaming device may be started 1201 when plugged into an electrical receptacle and turned on. Once it is started, the initialization of the gaming device 1202 may include ensuring all the physical and electronic components function properly. This may include a check of the processor boards and software that incorporates the progressive method. The gaming device may then establish communications with the device driver 1203 to receive the prize data and game data it needs to perform the progressive method.

After all initialization is completed, the gaming device may present the available prizes to the participant 1204. As the participant dropped coins into the coin hopper and/or inserted paper currency into the bill acceptor the gaming device may tally the monetary transaction value 1205. When the participant touches the button to start play 1206, the gaming device may execute play 1207 for each prize. If the play results in a prize award event for the big prize 1208, the gaming device may disable itself 1209 and create the appropriate visual and audio output to notify the participant of the prize award 1210. The gaming device may then generate a prizeaward event for the central system 1211. If the big prize were not won, then a check may be made to see if any of the little prizes were won 1212. If one was won then a coupon may be printed 1213 and a prize award event may be generated for the central system 1211.

Figure 13:
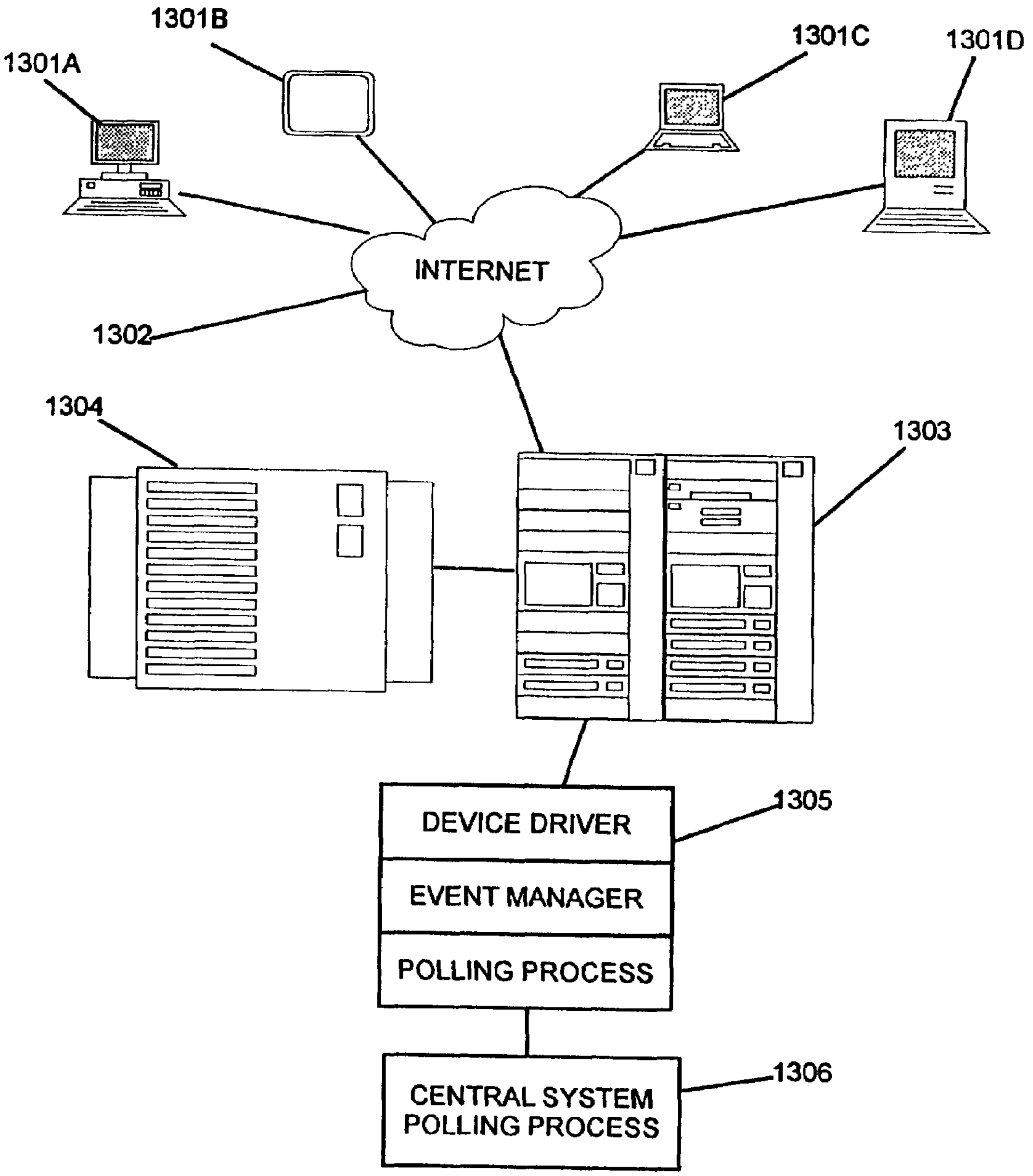
FIG. 13 is a diagram of a simple implementation of gaming enabled over the Internet.

FIG. 13 illustrates an embodiment wherein the progressive method is incorporated into software that may be used while connected to the Internet. Internet enabled devices 1301A, 1301B, 1301C, and 1301D once connected to the Internet 1302 would have access to the Internet server 1303. Several Internet gaming systems in existence have developed various methods to ensure the Internet customers have established accounts with the gaming software to allow them to play the gaming software and have a chance to win prizes. These activities may be are similar to the activities that occur in any casino that use player-tracking methods. Certain embodiments of the present invention provide a method that may be utilized by gaming software to allow people to participate for a prize over the Internet.

As will become very apparent, the methods presented that enable internet enabled gaming software to participate in common prizes may be adapted to enable any internet application that accepts a monetary transaction to also participate. In this embodiment, the prizes are open for play not only from the Internet server but also from any other location. Referencing FIG. 2, each element used to interface the Internet server to the central system may be identified to the central system to enable the polling processes to acquire monetary transactions made for prizes, process prize events and other acquisition data, just as they do for any location. The Internet server 1303 may be identified as a unique location 201. Each set of playable gaming software incorporating the progressive method residing on the disk arrays 1304 may be identified as a unique device 220. The GEM and device drivers 1305 are identified 205, 210. Each prize 2601 that the device 2602 is allowed to execute play for may then be identified in the linkage table 260.

When the Internet server 1303 establishes connection to the device driver 1305 in initialization mode, the message protocols may send all the prize and game configuration information to the Internet server's application level programs. This information may enable the Internet server to build the data structures that enable each set of the gaming software's progressive method to have the required prize and game data. During the actual playing of the gaming software, the same progressive method previously disclosed may execute play for prizes, depending on the manner in which the gaming software presents prizes to the participant. The prizes may be simply presented as one or more that may be won, or the prizes may be presented in a manner that enables a participant to select one or more for play, or the progressive method may be used to randomly select one or more prizes.

Figure 14:
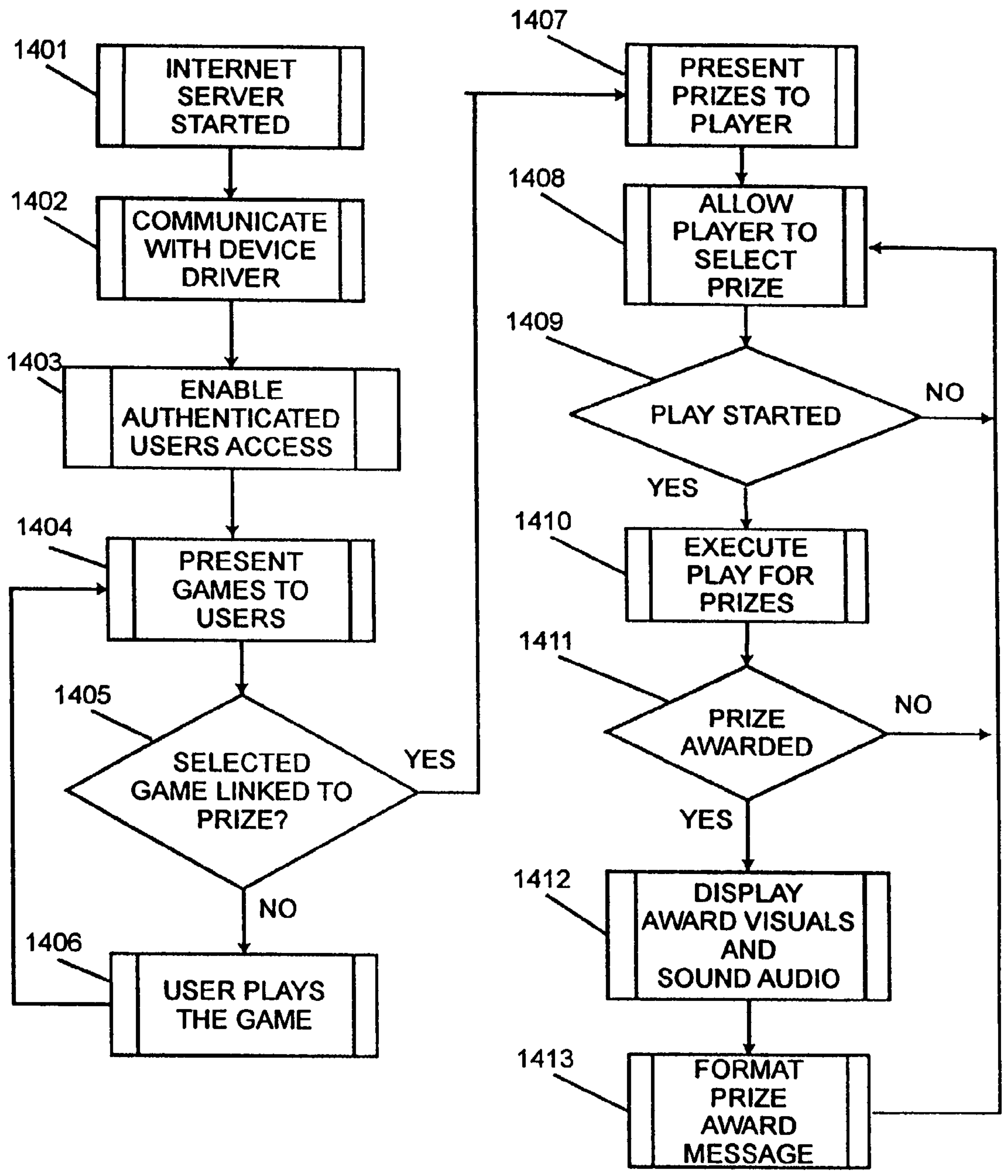
FIG. 14 is a flow chart illustrating the process of the Internet gaming software incorporating the progressive method.

There are many different methods an Internet gaming site may use to enable participants to participate in gaming. FIG. 14 illustrates an embodiment where some of the gaming software made available to participants incorporates the progressive method. When the Internet server is started 1401, part of its initialization process may be to establish communications with the device driver to receive the prize and game data 1402. As the users start to log into the Internet server, they may be authenticated 1403 and the gaming software they are authorized to play may be presented 1404.

As the user selected a set of gaming software the Internet server's control methods may determine if the software contains the progressive method 1405. If the gaming software does not contain the progressive method, then the user may simply use the gaming software according to the normal methods employed by the Internet server's control methods 1406.

When a set of gaming software does incorporate the progressive method, those methods may be presented to the user in addition to the normal methods employed by the Internet server's control methods. The gaming software may present the available prizes to the participant 1407. In this depicted embodiment, the gaming software may then allow the participant to select a prize 1408. As has been presented previously, other embodiments may simply present prizes to the user, randomly select prizes, or any combination thereof.

When the user elects to start play according to the gaming software's control methods 1409, the gaming software may execute play 1410 for each selected prize, as previously disclosed. If the play results in a prize award event 1411, the gaming software may create the appropriate visual and audio output to notify the participant of the prize award 1412. The gaming software may then generate a prize award event for the central system 1413.

Figure 15:
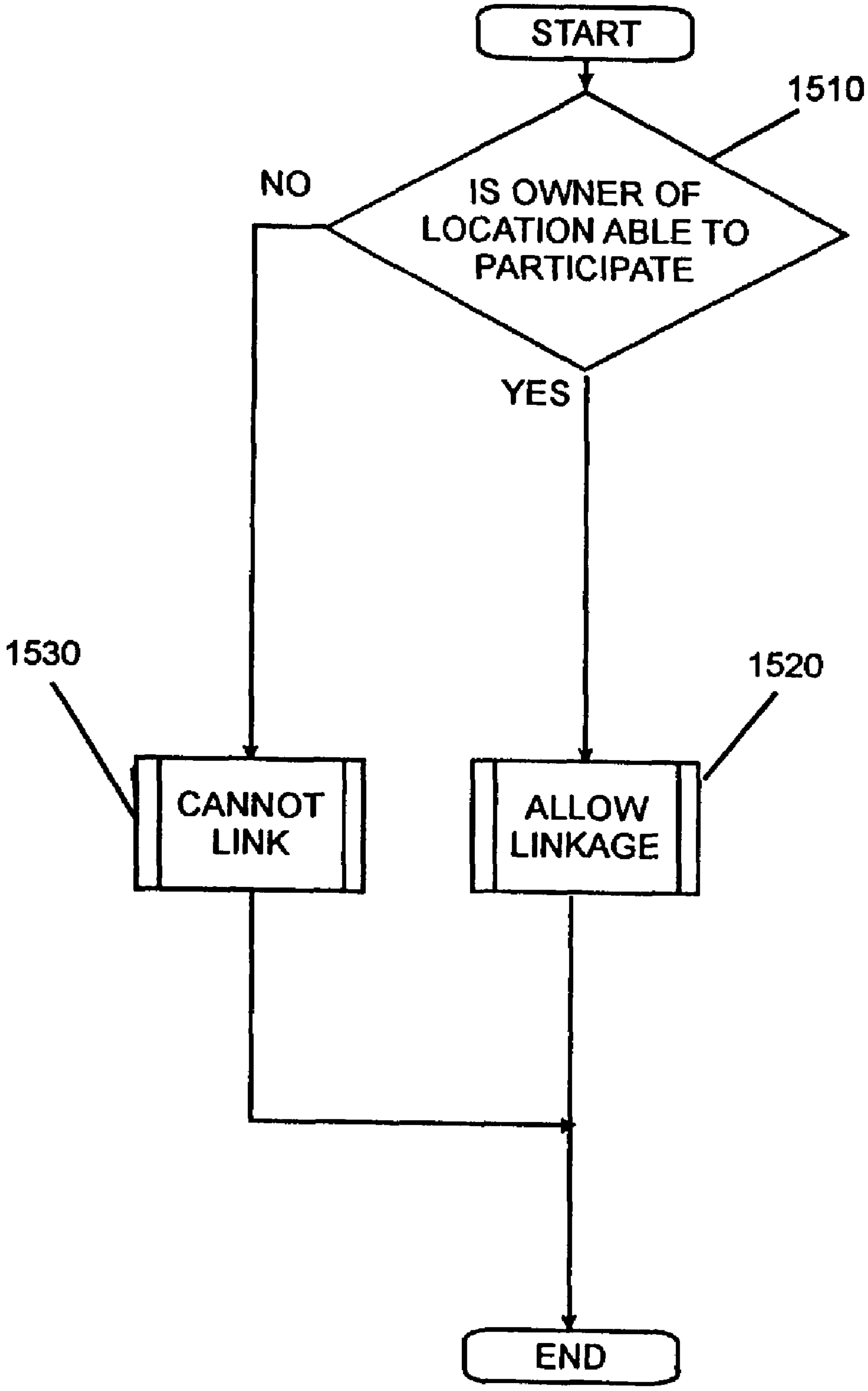
FIG. 15 is a flow chart depicting the decisions used when linking a device to a prize.

In any Internet gaming system, there may be a multitude of other logical steps the gaming software may be required to perform. The control processes that logically link the progressive method with a prize is illustrated in FIG. 15. The first check 1510 ensures the owner of the location where the device physically exists has authorization to participate. Referencing FIG. 2, this is a matter of ensuring the owner value 2012 in the location data 201 exists in the owner value 2502 in the participation authorization data 250 for the subject prize 2601, 2501. If the data exists the linkage 1520 is allowed. If the data does not exist, the linkage is not allowed 1530.

As devices are then logically linked to a prize, the linkage methods build the relationship of the prize 2601 and the devices 2602 in the prize and progressive method linkage table 260. This logical linkage between a prize and a device containing a progressive method may then enable the central system to provide the progressive method with the prize and device data the progressive method needs to determine a win/lose outcome. In other embodiments the conditions on linking may not require a determination of authorization, or there may be additional conditions required by regulatory agencies.

As previously disclosed, the progressive method may be incorporated into any device that accepts a monetary transaction. The specific methods used by different devices or software to enable participants to make monetary transactions may vary to an unlimited extent due to marketing decisions and competition for participation. However, when the device incorporates the progressive method of presenting prizes and executing play for those prizes, the steps used by the progressive method may remain intact. Establishing a prize's total contribution amount, establishing a game's contribution percent factor, and establishing logical linkage between a prize and a progressive method enable the progressive method. Due to constant advances in the networking and communication protocol technology, the methods used to communicate the prize and device data to the progressive method and the methods for communicating polling data and event data between a device driver and a device may vary to an unlimited extent.

In one embodiment, once the system has been implemented and prizes are linked with devices using progressive methods, the devices may be enabled for participation. As participation occurs, the device drivers may monitor each device for a monetary transaction according to the type of device. For each monetary transaction, the device driver may format a message based on monetary transaction values taken from the device. The message may be sent to the central system to record the current transaction and accumulate amounts.

FIG. 16 illustrates the processes that may be used to accumulate wager amounts by currency and contribution percent factor where the linked devices are typical gaming devices. The central system accumulates contribution amounts made on each prize by currency in a matrix for each win number 1605A, 1605B. As the system receives the new game meters 1601, it computes the change 1602 from the prior game meters value 1603 then replaces the prior meter values 1603 with the new game meters 1601. The prize win numbers 16014, 16015, currency 16016 and the contribution percent factor 16017 may then be used to point to a wager accumulator for each prize 16052A, 16052B. Then the value of wagers made 16023 may then be used to increment the accumulated wagers 16052A, 16052B.

Periodically, the system may compute the current prize value for display to participants. The prize value is preferably computed in the currency of the prize. The following is an equation preferably used to compute a current prize value.

$$PA+(\text{sum of}((WC*GC)*ER)*IP)$$

where

PA=the minimum prize amount

WC=wagers by currency

GC=game contribution percent factor

ER=exchange rate from wager currency to prize currency

IP=prize's increment percent factor

FIG. 17 illustrates the computation process in the most preferred embodiment. The minimum prize amount 1702 (2558 in FIG. 2) is added to the sum of all the accumulated wagers 1701 after they are converted to an increment monetary value 1703. The result is the current prize value 1704.

Figure 18:
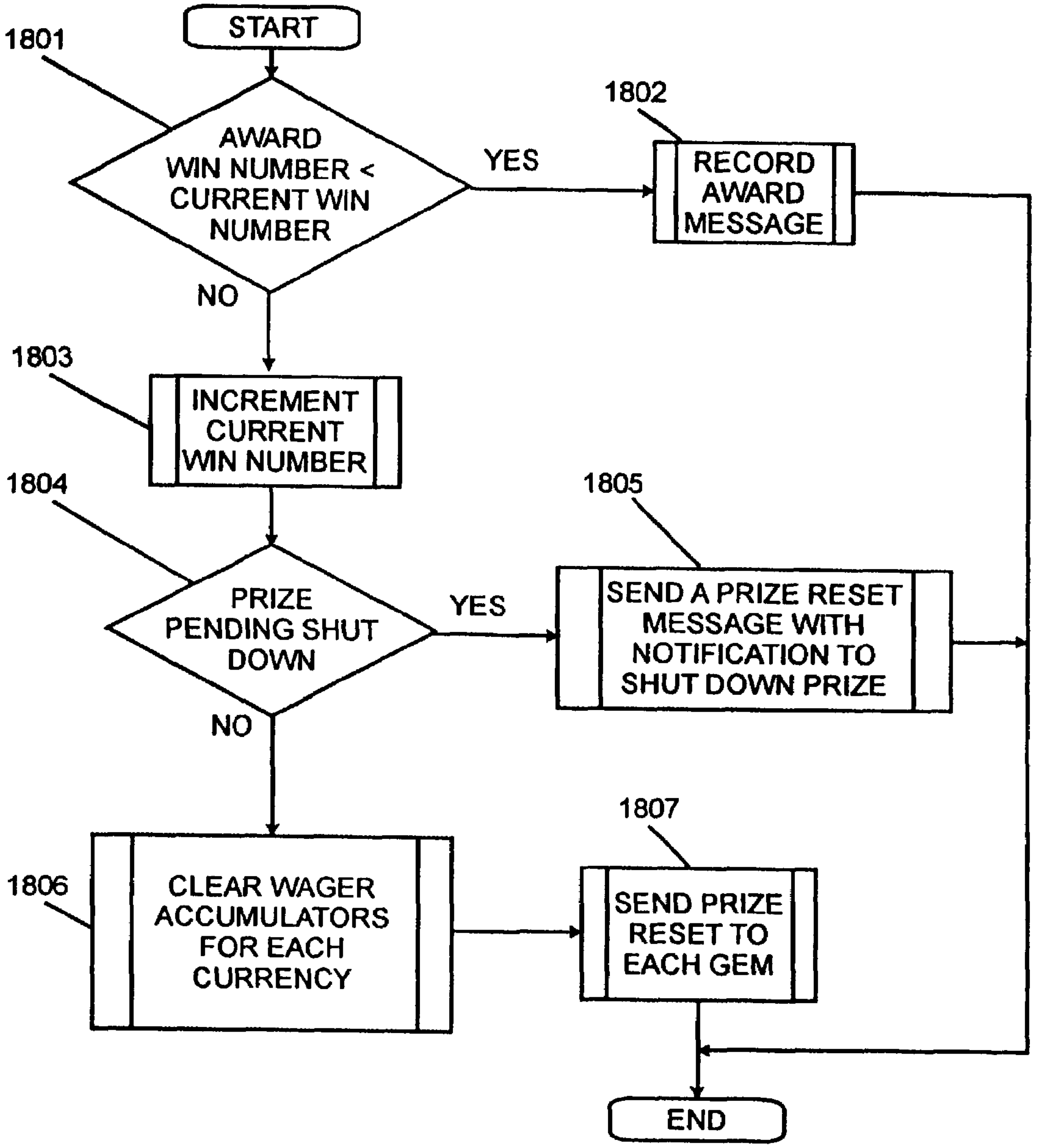
FIG. 18 is a flow chart depicting the decisions used to process a prize award event.

When a device generates a prize award event, it sends a prize award message to the device driver. The device driver formats a system prize award message and sends it to the central system. FIG. 18 contains a flowchart that describes the processes that occur in the preferred embodiment when the central system starts the prize award process. The prize award's win number is compared to the current win number for the prize 1801. If the win number is less than the current win number then the prize award message is for a previous prize. In this case, the prize award message is recorded then sent to the business function for processing 1802. If the win number is not less than the current win number then the prize award is for the current prize. The process then increments the win number 1803. At this point the process checks to see if the prize's status 2552 is set to pending shut down 1804. If it is, then the prize reset message, with a logical flag instructing all device drivers to close the prize processing for this prize, is sent to all device drivers controlling devices linked to the prize 1805.

The progressive control process may clear the monetary transaction accumulation data areas to initialize them for processing the new win number 1806. It may start the new win number by sending the prize reset message to all device drivers controlling devices linked to the prize 1807. As each device driver receives the prize reset message, it notifies the device of the new prize value. If the device responds with confirmation that it has changed the prize value, then a new base line of any device meters may be sent to the central system with the old win number. If the device responds with a prize hit message, then the device driver may format both a prize hit message and a meter message using the old win number and sends both messages to the central system. The win number associated with the device may then be incremented. As each device driver will receive the reset message at different times, and the time taken to reset the device may vary depending on conditions, such as the device being in a state of consummating a monetary transaction, there may be monetary transaction messages for the same prize received by the central system with different win numbers.

Figure 19:
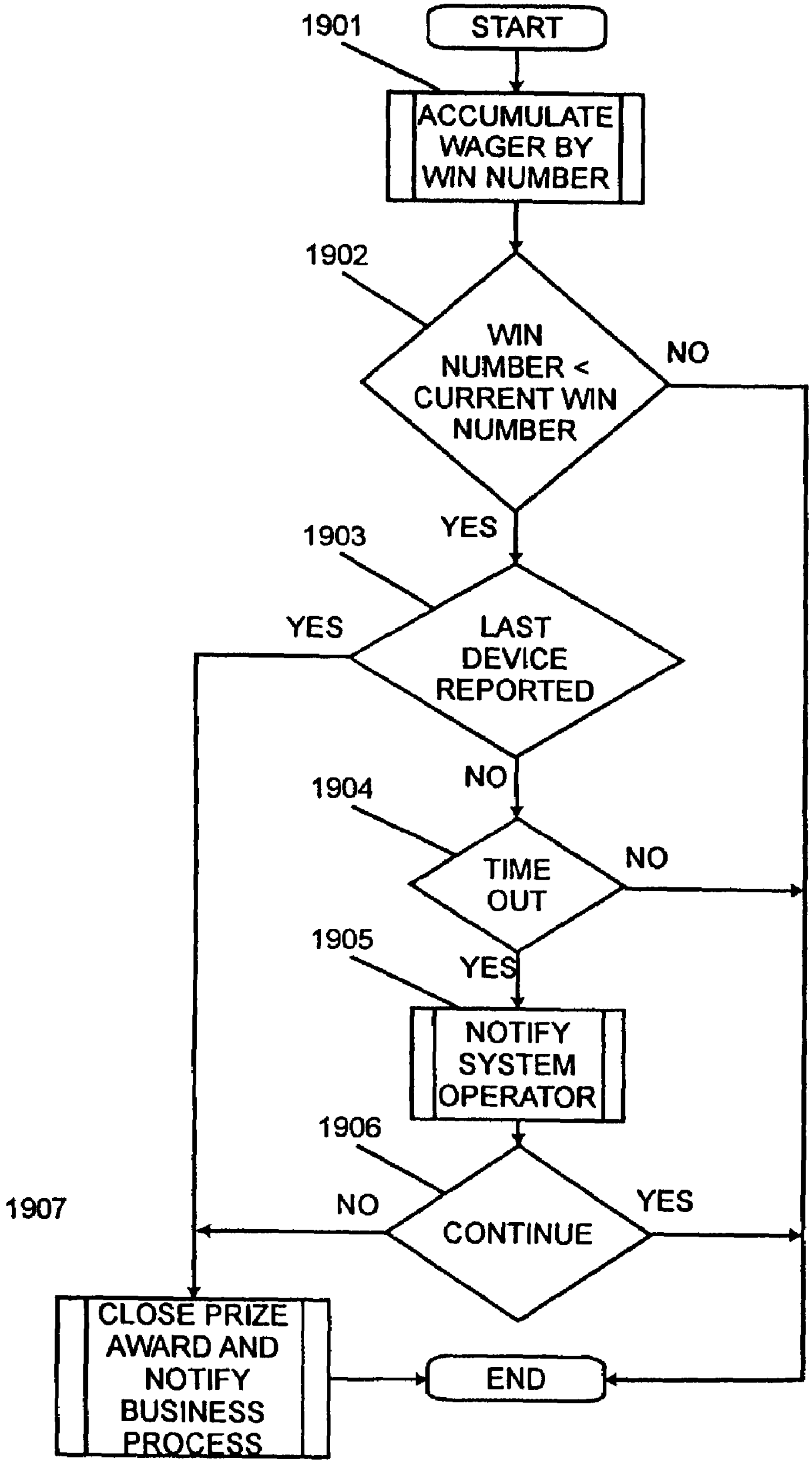
FIG. 19 is a flow chart depicting the accumulation of monetary transactions as it relates to prize award processes.

FIG. 19 describes the processes that occur in the preferred embodiment when monetary transactions for a prize are being reported under more than one win number. The process preferably checks the prize's win number associated with the monetary transaction against the current win number 1902. If the win number is less than the current win number, then the transaction is for a prize award. In this case, a check is made to see if the device associated with the transaction is the last to be reported 1903. If this is the last device to report transactions for the prize award, then the prize award is closed and the business process is notified 1907. If it is not the last, then a check is made to see if the time allocated to performing the prize award has been exceeded 1904. If this is the case, the system operator is notified 1905 of the devices that have not reported. The system operator makes the decision 1906 to either continue the prize process or proceed to close the prize award process 1907.

Each location may be physically sited in wide ranging geographical locations spanning a plurality of international time zones. The owner of each location may determine the open and close times, holiday schedules, and the time of day used to transition business days. The central system may use the open and close times and holiday schedules to notify each GEM at the location to set the attached devices to an open or closed status.

When a location's time for end of day is reached, the central system may notify each GEM at the location to send the current meters for end of day. When the meters are received, they may be are sent to the business functions to process the location's end of day. The use of device drivers to monitor and control devices eliminates the chance of bad meter data entering into the system. Each device may have the limits of normal operating criteria defined that may enable its device driver to detect invalid monetary transactions and runaway conditions before they get into the system data. In the event invalid meters or runaway conditions are detected, the device driver may disable the offending device and notify the central system via a generated event message. This eliminates the often labor intensive tasks normally associated with correcting meter data and the need to protect against a runaway gaming device driving the prize value to an excessive value.

CONCLUSION

The specification discloses certain embodiments of the invention that expand the participation base for a prize. Certain embodiments provide logical linkage methods, which enable any device accepting a monetary transaction to be linked with a prize. Certain embodiments provide progressive methods that allow a contribution percent factor to be assigned to each linked device thus enabling devices with widely varying theoretical payouts to participate in common prizes.

Certain embodiments further provide progressive methods that enable participants to perform monetary transactions using the currency common to their particular location while participating in the endeavor to win a common prize.

Although the description above contains many specifications, these should not be construed as limiting the scope of the invention but as merely providing illustrations of some of the presently preferred embodiments of this invention. Thus, the scope of the invention should be determined by the issued claims and their legal equivalents rather than by the examples given.

What is claimed is:

1. A progressive gaming system capable of accepting a monetary transaction value in a plurality of currencies or a plurality of denominations of the same currency and capable of awarding at least one prize, the progressive gaming system comprising:

(A) a central system, the central system being adapted to control the progressive gaming system;

(B) at least one prize, the prize having a total contribution amount;

(C) at least one monetary transaction acceptor in communication with the central system, the at least one monetary transaction acceptor having a contribution percent factor, the at least one monetary transaction acceptor being adapted to receive a monetary transaction value; and (D) at least one progressive method, the at least one progressive method being adapted to be associated by the central system with the at least one prize and with the at least one monetary transaction acceptor, thereby allowing the at least one monetary transaction acceptor to participate for the at least one prize, the at least one progressive method being further adapted to determine a participation outcome, wherein the participation outcome is determined based on the at least one prize's total contribution amount, the at least one monetary transaction acceptor's contribution percent factor, the monetary transaction value, and a predefined prize winning number.

2. The progressive gaming system of claim 1, wherein the at least one monetary transaction acceptor comprises a gaming device adapted to allow a participant to play a game.

3. The progressive gaming system of claim 1, wherein the at least one monetary transaction acceptor comprises a point of sale device, the point of sale device being adapted to enable a monetary transaction.

4. The progressive gaming system of claim 1, wherein the at least one monetary transaction acceptor comprises an internet-enabled monetary transaction acceptor, the internet-enabled monetary transaction acceptor being adapted to enable a monetary transaction.

5. The progressive gaming system of claim 1, wherein the at least one monetary transaction acceptor is connected to a secondary device.

6. The progressive gaming system of claim 5, wherein the at least one progressive method is stored in the secondary device.

7. The progressive gaming system of claim 1, wherein the at least one progressive method is stored in the at least one monetary transaction acceptor.

8. The progressive gaming system of claim 1, wherein the monetary transaction value is a wager amount.

9. The progressive gaming system of claim 1, wherein the monetary transaction value is a payment for a good.

10. The progressive gaming system of claim 1, wherein the monetary transaction value is a payment for a service.

11. The progressive gaming system of claim 1, wherein the central system is adapted to provide the at least one progressive method with at least the at least one prize's total contribution amount.

12. The progressive gaming system of claim 1, wherein the at least one progressive method is adapted to receive the at least one prize's total contribution amount from the central system.

13. The progressive gaming system of claim 1, wherein the central system is adapted to provide the at least one progressive method with the at least one monetary transaction acceptor's contribution percent factor.

14. The progressive gaming system of claim 1, wherein the at least one progressive method is adapted to receive the at least one monetary transaction acceptor's contribution percent factor from the central system.

15. The progressive gaming system of claim 1, wherein the at least one progressive method is adapted to receive the monetary transaction value from the at least one monetary transaction acceptor.

16. The progressive gaming system of claim 1, wherein the at least one progressive method is adapted to determine the participation outcome for awarding the prize by obtaining a maximum random number range by dividing the total contribution amount by the product of the contribution percent factor and the monetary transaction value, generating a random number within the maximum random number range, and comparing the generated random number with a predefined prize winning number.

17. A progressive gaming system capable of accepting a monetary transaction value in a plurality of currencies or a plurality of denominations of the same currency and capable of awarding at least one prize, the at least one prize having a total contribution amount, the progressive gaming system comprising:

(A) at least one accepting means for accepting a monetary transaction value, the at least one accepting means having a contribution percent factor;

(B) at least one participation outcome means for determining a prize award event;

(C) a control means for controlling the progressive gaming system, the control means being adapted to associate the at least one participation outcome means with the at least one prize, the control means being further adapted to associate the at least one participation outcome means with the at least one accepting means thereby allowing the at least one accepting means to participate for the at least one prize, wherein the at least one participation outcome means determines the participation outcome based on at least the at least one accepting mean's contribution percent factor.

18. A device for linking at least one monetary transaction acceptor to at least one prize, the at least one prize having a total contribution amount, the at least one monetary transaction acceptor capable of accepting a monetary transaction value in a plurality of currencies or a plurality of denominations of the same currency having a contribution percent factor, the at least one monetary transaction acceptor being adapted to receive a monetary transaction value, the device comprising:

(A) a central system; and (B) a progressive method in communication with the central system, the progressive method being adapted to be associated by the central system to the at least one monetary transaction acceptor, the progressive method being further adapted to detect the at least one monetary transaction acceptor's contribution percent factor, whereby the at least one monetary transaction acceptor is allowed to participate for the at least one prize.

19. The device of claim 18, wherein the at least one monetary transaction acceptor comprises a gaming device adapted to allow a participant to play a game.

20. The device of claim 18, wherein the at least one monetary transaction acceptor comprises a point of sale device, the point of sale device being adapted to enable a monetary transaction.

21. The device of claim 18, wherein the at least one monetary transaction acceptor comprises an internet-enabled monetary transaction acceptor, the internet-enabled monetary transaction acceptor being adapted to enable a monetary transaction.

22. The device of claim 18, wherein the at least one monetary transaction acceptor is connected to a secondary device.

23. The device of claim 22, wherein the progressive method is stored in the secondary device.

24. The device of claim 18, wherein the progressive method is stored in the at least one monetary transaction acceptor.

25. The device of claim 18, wherein the monetary transaction value is a wager amount.

26. The device of claim 18, wherein the monetary transaction value is a payment for a good.

27. The device of claim 18, wherein the monetary transaction value is a payment for a service.

28. The device of claim 18, wherein the central system is adapted to provide the progressive method with the at least one prize's total contribution amount.

29. The device of claim 18, wherein the progressive method is adapted to receive the at least one prize's total contribution amount from the central system.

30. The device of claim 18, wherein the central system is adapted to provide the progressive method with the at least one monetary transaction acceptor's contribution percent factor.

31. The device of claim 18, wherein the progressive method is adapted to receive the at least one monetary transaction acceptor's contribution percent factor from the central system.

32. The device of claim 18, wherein the progressive method is adapted to receive the monetary transaction value from the at least one monetary transaction acceptor.

33. The device of claim 18, wherein the progressive method is adapted to determine a participation outcome by obtaining a maximum random number range by dividing the total contribution amount by the product of the contribution percent factor and the monetary transaction value, generating a random number within the maximum random number range, and comparing the generated random number with a predefined prize winning number.

34. A method of operating a progressive system, the system being capable of accepting a monetary transaction value in a plurality of currencies or a plurality of denominations of the same currency, the method comprising:

(A) providing linkage between at least one prize and at least one monetary transaction acceptor;

(B) determining a total contribution amount for the at least one prize;

(C) determining a contribution percent factor for the at least one monetary transaction acceptor;

(D) providing at least one progressive method;

(E) associating the at least one progressive method with the at least one monetary transaction acceptor;

(F) detecting a monetary transaction value from the monetary transaction acceptor; and (G) determining a participation outcome based on the total contribution amount, the contribution percent factor, the monetary transaction value, and at least one predefined prize winning number.

35. The method of claim 34, wherein determining a total contribution amount for the at least one prize comprises computing the sum of all contributions made for each theoretical prize award event.

36. The method of claim 34, wherein determining the contribution percent factor for the at least one monetary transaction acceptor comprises defining the portion of each monetary transaction value that will be contributed to the at least one prize.

37. The method of claim 34, wherein determining a participation outcome based on the total contribution amount, the contribution percent factor, the monetary transaction value, and the predefined prize winning number further comprising:

(A) dividing the total contribution amount by the product of the monetary transaction value and the contribution percent factor to obtain a maximum random number range;

(B) generating a random number within the maximum random number range;

(C) providing the predefined prize winning number; and (D) comparing the generated random number with the predefined prize winning number.

38. The method of claim 34, further comprising notifying a participant of the participation outcome.

39. The method of claim 34, further comprising notifying a central system of the participation outcome.

40. A method for interfacing a monetary transaction acceptor with a progressive method, the progressive method enabling the monetary transaction acceptor to participate in at least one prize, the method comprising:

(A) allowing the progressive method to receive at least one prize's total contribution amount;

(B) allowing the progressive method to receive a contribution percent factor of the monetary transaction acceptor;

(C) allowing the progressive method to receive a monetary transaction value as a transaction transpires on the monetary transaction acceptor;

(D) allowing the progressive method to determine a participation outcome using the total contribution amount, the contribution percent factor and the monetary transaction value; and (E) allowing the monetary transaction acceptor to query the progressive method for the participation outcome, whereby a participant utilizing the monetary transaction acceptor to initiate the monetary transaction is awarded at least one prize for each win outcome.

41. The progressive method of claim 40, the step of determining the participation outcome further comprising:

(A) obtaining a maximum random number range by dividing the at least one prize's total contribution amount by the product of the monetary transaction value and the contribution percent factor;

(B) generating a random number within the maximum random number range;

(C) providing a predefined prize winning number; and (D) comparing the generated random number with the predefined prize winning number.

42. The method of claim 40, further comprising notifying the participant of the participation outcome.

43. The method of claim 40, further comprising notifying the central system of the participation outcome.

44. A method of operating a progressive system, the system being capable of accepting monetary transaction values in a plurality of currencies or a plurality of denominations of the same currency, the method comprising:

(A) determining a total contribution amount for a prize;

(B) determining a contribution percent factor for a monetary transaction acceptor; and (C) linking the prize to the monetary transaction acceptor.

45. The method of claim 44, wherein determining a total contribution amount for a prize comprises computing the sum of all contributions made for each theoretical prize award event.

46. The method of claim 44, wherein determining the contribution percent factor for a monetary transaction acceptor comprises defining the portion of each monetary transaction value that will be contributed to the prize.

47. The method of claim 46, wherein determining the contribution percent factor for a monetary transaction acceptor further comprises defining the portion of each monetary transaction value that will be contributed to fund at least one of overhead costs and profits.

48. The progressive gaming system of claim 1, wherein the at least one progressive method is adapted to determine the participation outcome for awarding the prize by obtaining a super maximum random number range by dividing the total contribution amount by the product of the contribution percent factor and a lowest possible monetary transaction value, generating at least one random number within the super maximum random number range based on the monetary transaction value, and comparing each generated random number with a predefined prize winning number.

49. The progressive gaming system of claim 48, wherein the number of random numbers generated is the result of dividing the monetary transaction value by the lowest possible monetary transaction value.

50. The progressive gaming system of claim 1, wherein the at least one progressive method is adapted to determine the participation outcome for awarding the prize by obtaining a super maximum random number range by dividing the total contribution amount by the product of the contribution percent factor and a lowest possible monetary transaction value, determining at least one predefined prize winning number based on the monetary transaction value, generating a random number within the super maximum random number range, and comparing the random number with the at least one predefined prize winning number.

51. The progressive gaming system of claim 50, wherein the number of predetermined winning numbers is the result of dividing the monetary transaction value by the lowest possible monetary transaction value.

52. The device of claim 18, wherein the at least one progressive method is adapted to determine the participation outcome for awarding the prize by obtaining a super maximum random number range by dividing, the total contribution amount by the product of the contribution percent factor and a lowest possible monetary transaction value, generating at least one random number within the super maximum random number range based on the monetary transaction value, and comparing each generated random number with a predefined prize winning number.

53. The device of claim 52, wherein the number of random numbers generated is the result of dividing the monetary transaction value by the lowest possible monetary transaction value.

54. The device of claim 18, wherein the at least one progressive method is adapted to determine the participation outcome for awarding the prize by obtaining a super maximum random number range by dividing the total contribution amount by the product of the contribution percent factor and a lowest possible monetary transaction value, determining at least one predefined prize winning number based on the monetary transaction value, generating a random number within the super maximum random number range, and comparing the random number with the at least one predefined prize winning number.

55. The device of claim 54, wherein the number of predetermined winning numbers is the result of dividing the monetary transaction value by the lowest possible monetary transaction value.

56. The method of claim 34, wherein determining a participation outcome based on the total contribution amount, the contribution percent factor, the monetary transaction value, and the predefined prize winning number further comprises:

(A) dividing the total contribution amount by the product of the contribution percent factor and a lowest possible monetary transaction value to obtain a super maximum random number range;

(B) generating at least one random number within the super maximum random number range based on the monetary transaction value, and (C) comparing each generated random number with the predefined prize winning number.

57. The method of claim 56, wherein the number of random numbers generated in step (B) comprises dividing the monetary transaction value by the lowest possible monetary transaction value.

58. The method of claim 34, wherein determining a participation outcome based on the total contribution amount, the contribution percent factor, the monetary transaction value, and the predefined prize winning number further comprises:

(A) dividing the total contribution amount by the product of the contribution percent factor and a lowest possible monetary transaction value to obtain a super maximum random number range;

(B) determining at least one predefined prize winning number based on the monetary transaction value, (C) generating a random number within the super maximum random number range, and (D) comparing the random number with the at least one predefined prize winning number.

59. The method of claim 58, wherein the number of predetermined winning numbers in Step (B) comprises the result of dividing the monetary transaction value by the lowest possible monetary transaction value.

60. The progressive method of claim 40, the step of determining a participation outcome further comprising:

(A) dividing the total contribution amount by the product of the contribution percent factor and a lowest possible monetary transaction value to obtain a super maximum random number range;

(B) generating at least one random number within the super maximum random number range based on the monetary transaction value, and (C) comparing each generated random number with the predefined prize winning number.

61. The method of claim 60, wherein the number of random numbers generated in step (B) comprises dividing the monetary transaction value by the lowest possible monetary transaction value.

62. The method of claim 40, wherein determining a participation outcome based on the total contribution amount, the contribution percent factor, the monetary transaction value,and the predefined prize winning number further comprises:

(A) dividing the total contribution amount by the product of the contribution percent factor and a lowest possible monetary transaction value to obtain a super maximum random number range, (B) determining at least one predefined prize winning number based on the monetary transaction value, (C) generating a random number within the super maximum random number range, and (D) comparing the random number with the at least one predefined prize winning number.

63. The method of claim 62, wherein the number of predetermined winning numbers in step (B) comprises the result of dividing the monetary transaction value by the lowest possible monetary transaction value.

64. A method for interfacing a monetary transaction acceptor with a progressive method, the progressive method enabling the monetary transaction acceptor to participate in at least one prize, the method comprising:

(A) receiving at least one prize's total contribution amount in to the progressive method;

(B) receiving a contribution percent factor of the monetary transaction acceptor in to the progressive method;

(C) receiving a monetary transaction value from a monetary transaction in to the progressive method at substantially the same time as a transaction transpires on the monetary transaction acceptor;

(D) determining a participation outcome with the progressive method using the total contribution amount, the contribution Percent factor and the monetary transaction value; and (E) communicating the participation outcome to the monetary transaction acceptor, whereby a participant utilizing the monetary transaction acceptor to initiate the monetary transaction is awarded at least one prize for each win outcome.

65. The progressive method of claim 64, the step of determining a participation outcome further comprising:

(A) dividing the total contribution amount by the product of the contribution percent factor and a lowest possible monetary transaction value to obtain a super maximum random number range;

(B) generating at least one random number within the super maximum random number range based on the monetary transaction value, and (C) comparing each generated random number with the predefined prize winning number.

66. The method of claim 65, wherein the number of random numbers generated in step (B) comprises dividing the monetary transaction value by the lowest possible monetary transaction value.

67. The method of claim 64, wherein determining a participation outcome based on the total contribution amount, the contribution percent factor, the monetary transaction value, and the predefined prize winning number further comprises:

(A) dividing the total contribution amount by the product of the contribution percent factor and a lowest possible monetary transaction value to obtain a super maximum random number range, (B) determining at least one predefined prize winning number based on the monetary transaction value, (C) generating a random number within the super maximum random number range, and (D) comparing the random number with the at least one predefined prize winning number.

68. The method of claim 67, wherein the number of predetermined winning numbers in step (B) comprises the result of dividing the monetary transaction value by the lowest possible monetary transaction value.

69. A method of creating linkage between a progressive prize and at least one monetary transaction acceptor comprising the steps of:

(A) determining a host computer total contribution amount for at least one progressive prize;

(B) recording the host computer total contribution amount on a host computer;

(C) recording a monetary transaction acceptor total contribution amount on a monetary transaction acceptor; and (D) linking the prize to the monetary transaction acceptor when the host computer total contribution amount is substantially equal to the monetary transaction acceptor total contribution amount.

70. The method of claim 69 wherein the monetary transaction acceptor is a gaming device.

71. The method of claim 69 wherein the monetary transaction acceptor is a point-of-sale device.

72. A method of operating a prize award system, the prize award system comprising a host computer directly or indirectly in communication with at least one monetary transaction acceptor, comprising the following steps:

(A) determining a host computer total contribution amount for at least one progressive prize;

(B) recording the host computer total contribution amount on a host computer;

(C) recording a monetary transaction acceptor total contribution amount on a monetary transaction acceptor;

(D) linking the prize to the monetary transaction acceptor when the host computer total contribution amount is substantially equal to the monetary transaction acceptor total contribution amount; and (E) allowing at least one person or entity to complete a monetary transaction on the monetary transaction acceptor that competes for the prize when the host computer total wager amount is substantially equal to the monetary transaction acceptor total wager amount.

73. The method of claim 72 wherein the monetary transaction acceptor is a gaming device.

74. The method of claim 72 wherein the monetary transaction acceptor is a point-of-sale device.

75. The progressive gaming system of claim 1, wherein the at least one progressive method is adapted to include an Internet server to enable personal computers, or other web enabled devices connected to the internet, to participate in a common prize.

* * * * *